(12) United States Patent
Cahill

(10) Patent No.: US 8,010,783 B1
(45) Date of Patent: Aug. 30, 2011

(54) SERVICE PROVIDER INVOCATION

(75) Inventor: Conor P Cahill, Waterford, VA (US)

(73) Assignee: AOL Inc., Dulles, VA (US)

( * ) Notice: Subject to any disclaimer, the term of this patent is extended or adjusted under 35 U.S.C. 154(b) by 1223 days.

(21) Appl. No.: 11/079,709

(22) Filed: Mar. 14, 2005

Related U.S. Application Data

(60) Provisional application No. 60/562,659, filed on Apr. 15, 2004, provisional application No. 60/651,471, filed on Jan. 7, 2005.

(51) Int. Cl.
*H04L 29/06* (2006.01)

(52) U.S. Cl. ............... 713/155; 713/156; 726/7; 726/9; 726/10

(58) Field of Classification Search ................... None
See application file for complete search history.

(56) References Cited

U.S. PATENT DOCUMENTS

| | | | |
|---|---|---|---|
| 5,638,412 A * | 6/1997 | Blakeney et al. | ............. 375/377 |
| 5,721,779 A | 2/1998 | Funk | |
| 6,070,191 A | 5/2000 | Narendran et al. | |
| 6,269,395 B1 | 7/2001 | Blatherwick et al. | |
| 6,654,807 B2 | 11/2003 | Farber et al. | |
| 6,775,687 B1 | 8/2004 | Binding et al. | |
| 6,799,214 B1 | 9/2004 | Li | |
| 6,799,272 B1 | 9/2004 | Urata | |
| 6,802,004 B1 | 10/2004 | Gross et al. | |
| 6,823,454 B1 | 11/2004 | Hind et al. | |
| 6,826,690 B1 | 11/2004 | Hind et al. | |
| 6,850,484 B1 | 2/2005 | Greenspan et al. | |
| 6,877,095 B1 * | 4/2005 | Allen | ............................ 713/182 |
| 6,892,307 B1 * | 5/2005 | Wood et al. | ........................ 726/8 |
| 7,083,095 B2 | 8/2006 | Hendrick | |
| 7,249,260 B2 | 7/2007 | Moffat et al. | |
| 7,296,290 B2 | 11/2007 | Barriga et al. | |
| 7,299,493 B1 * | 11/2007 | Burch et al. | ....................... 726/5 |
| 7,350,076 B1 | 3/2008 | Young et al. | |
| 7,356,575 B1 | 4/2008 | Shapiro | |
| 7,356,803 B2 | 4/2008 | Bau et al. | |
| 7,469,341 B2 | 12/2008 | Edgett et al. | |
| 7,530,099 B2 * | 5/2009 | Flurry et al. | ....................... 726/8 |
| 7,603,469 B2 * | 10/2009 | Fletcher et al. | ............... 709/229 |
| 2001/0002485 A1 * | 5/2001 | Bisbee et al. | ................... 713/167 |
| 2002/0031230 A1 * | 3/2002 | Sweet et al. | .................... 380/278 |
| 2002/0150253 A1 * | 10/2002 | Brezak et al. | .................. 380/281 |
| 2003/0023957 A1 | 1/2003 | Bau et al. | |
| 2004/0003228 A1 | 1/2004 | Fehr et al. | |

(Continued)

OTHER PUBLICATIONS

Fielding et al. Request for Comments: 2616 (Hypertext Transfer Protocol—HTTP/1.1). Jun. 1999.*

(Continued)

*Primary Examiner* — Gilberto Barron, Jr.
*Assistant Examiner* — Virginia Ho
(74) *Attorney, Agent, or Firm* — Finnegan, Henderson, Farabow, Garrett & Dunner, LLP

(57) ABSTRACT

A service provider may provide one or more services to and/or for a client. Providing a service may involve receiving a service request including a security token at the service provider and determining whether the security token is valid. Providing the service may also involve determining a session security token if the security token is valid and generating a service response including the session security token. Providing the service may further involve receiving a service request including the session security token, determining whether the session security token is valid, and, if the session security token is valid, generating a second service response.

19 Claims, 6 Drawing Sheets

U.S. PATENT DOCUMENTS

| | | | |
|---|---|---|---|
| 2004/0006713 | A1 | 1/2004 | Minemura |
| 2004/0098415 | A1 | 5/2004 | Bone et al. |
| 2004/0098590 | A1 | 5/2004 | Fausse |
| 2004/0250077 | A1 | 12/2004 | Jang et al. |
| 2005/0060551 | A1 | 3/2005 | Barchi et al. |
| 2005/0105735 | A1 | 5/2005 | Iino et al. |

OTHER PUBLICATIONS

William Duserick, Liberty Alliance Project, Whitepaper on Liberty Protocol and Identity Theft, Feb. 20, 2004, pp. 1-11.
John Kemp, Liberty Alliance Project, Liberty ID-WSF-a Web Services Framework, © 2004, pp. 1-15.
Liberty Alliance Project White Paper, Liberty Alliance & WS-Federation: A Comparative Overview, Oct. 14, 2003, pp. 1-10.
Liberty Alliance Project, Business Benefits of Federated Identity, Apr. 2003, pp. 1-14.
Jason Rouault, Liberty Alliance Project, Liberty Bindings and Profiles Specification, Version 1.0, Jul. 11, 2002, pp. 1-57.
Jeff Hodges, Liberty Alliance Project, Liberty Architecture Overview, Version 1.0, Jul. 11, 2002, pp. 1-41.
Paul Madsen, Liberty Alliance Project, Liberty Authentication Context Specification, Version 1.0, Jul. 11, 2002, pp. 1-35.
Liberty Alliance Membership Agreement, Aug. 27, 2004, pp. 1-24.
Gary Ellison, Liberty Alliance Project, Liberty ID-WSF Security Mechanisms, Version 1.2, copyright 2004, pp. 1-48.
Jeff Hodges, John Kemp, and Robert Aarts, Liberty Alliance Project, Liberty ID-WSF SOAP Binding Specification, Version 1.2, copyright 2004, pp. 1-60.
Jeff Hodges and Robert Aarts, Liberty Alliance Project, Liberty ID-WSF Authentication Service and Single Sign-On Service Specification, Version v1.1, copyright 2004, pp. 1-42.
Jonathan Tourzan and Yuzo Koga, Liberty Alliance Project, Liberty ID-WSF Web Services Framework Overview, Version 1.1, copyright 2004, pp. 1-30.
Simpson, W. PPP Challenge Handshake Authentication Protocol (CHAP), Aug. 1996, Network Working Group, Request for Comments: 1994, pp. 1-13.
Teshone Hailu, Non-Final Office Action issued by the U.S. Patent and Trademark Office on Aug. 20, 2008 in U.S. Appl. No. 11/031,957.
Teshone Hailu, Final Office Action issued issued by the U.S. Patent and Trademark Office on Feb. 2009 in U.S. Appl. No. 11/031,957.
Teshone Hailu, Non-Final Office Action issued by the U.S. Patent and Trademark Office on Nov. 25, 2009 in U.S. Appl. No. 11/031,957.
Thomas W. Richardson, Non-Final Office Action issued by the U.S. Patent and Trademark Office on Sep. 26, 2008 in U.S. Appl. No. 11/079,715.
Thomas W. Richardson, Final Office Action issued by the U.S. Patent and Trademark Office on Apr. 6, 2009 in U.S. Appl. No. 11/079,715.
Martin Jeriko P. San Juan, Non-Final Office Action issued by the U.S. Patent and Trademark Office on Sep. 8, 2008 in U.S. Appl. No. 11/079,713.
Martin Jeriko P. San Juan, Final Office Action issued by the U.S. Patent and Trademark Office on Feb. 26, 2009 in U.S. Appl. No. 11/079,713.

* cited by examiner

SERVICE PROVIDER INVOCATION

RELATED APPLICATIONS

This application claims the benefit of and incorporates by reference U.S. Provisional Patent Application No. 60/562,659, entitled "Digital Media Services for Electronic Devices" and filed on Apr. 15, 2004, and U.S. Provisional Patent Application No. 60/651,471, entitled "Digital Data Services" and filed on Jan. 7, 2005, which was originally U.S. patent application Ser. No. 11/031,964, entitled "Digital Data Services" and filed on Jan. 7, 2005, and converted to a provisional application in a request filed on Mar. 10, 2005.

TECHNICAL FIELD

This invention relates to computer networking and, more particularly, to providing computer-related services.

BACKGROUND

In general, a client may receive data from a server in either of two ways. One way is for a browser (or other client-side application) to request new data from the server (often referred to as "pulling" data). Another way is for the server to send data to the client as the data becomes available (often referred to as "pushing" data).

Before consuming resources by sending data, however, a server may desire to understand what and/or who is requesting the data. Clients and users may be identified and validated through a variety of techniques, such as passwords, security tokens, and certificates. For state-cognizant protocols, the client or user is typically validated once, at the beginning of the session. For stateless protocols, however, the client or user may have to be validated for each client-server interaction.

SUMMARY

A service provider may provide service to and/or for a client by a variety of techniques. In one general aspect, a process for invoking a service provider includes receiving a service request at the service provider, the request including a security token, and determining whether the security token is valid. If the security token is valid, the process calls for determining a session security token and generating a service response including the session security token. The process further calls for receiving a service request, the request including the session security token, determining whether the session security token is valid, and, if the session security token is valid, generating a second service response. The process may be implemented by machine, instructions embodied in an information carrier, or any other appropriate technique.

In particular implementations, determining a session security token may include determining whether a session security token should be generated and, if a session security token should be generated, generating the session security token. Also, the second service response may specify that future service requests should be sent to a different service provider.

Certain implementations may include determining whether one or more of the security tokens has become invalid. If the first security token has become invalid, or if the session security token has become invalid, the process may call for canceling the session security token.

The process also may call for determining whether a request to update the session security token has been received. If a request to update the session security token has been received, the process may include validating the request and updating the session security token if the request is valid.

The process additionally may call for receiving a third service request, the request including the session security token, and determining whether the session security token is valid. If the session security token is valid, the process may call for determining a second session security token and generating a service response including the second session security token.

The requests and responses may be expressed in a self-describing protocol, which may, for example, be the Simple Object Access Protocol. The service request may, for example, be a data service request, the service provider may, for example, be a data service provider, and the session security token may, for example, be a data session security token. In certain implementations, the security token may be received in a first request header type, and the session security token may be received in a second request header type.

In another general aspect, a process for invoking a service provider includes generating a service request at a client, the request including a security token and directed to a service provider, and receiving a service response including a session security token. The process also includes generating a second service request, the second request including the session security token and directed to the service provider. The process may be implemented by machine, instructions embodied in an information carrier, or any other appropriate scheme.

In certain implementations, the process may include monitoring the validity period of the session security token and, if the session security token is about to expire, determining whether the session should continue. If the session should continue, the process may call for generating a request to update the session security token.

The security token may be placed in a first request header type, and the session security token may be placed in a second request header type. The process also may call for receiving a second service response, the response including a second session security token.

Various implementations may have one or more features. In particular implementations, the ability of a service provider to substitute a self-determined security token for an externally-generated security token allows the service provider to achieve efficiencies on subsequent service requests that it receives. Also, the service provider may manage (e.g., update or change) the self-determined security token as it desires. In certain implementations, the service provider may also cache other session-related information at a client. This information also may allow the service provider to achieve efficiencies on subsequent service requests that it receives.

The details of one or more implementations are set forth in the accompanying drawings and the description below. Other features will be apparent from the description and drawings, and from the claims.

DETAILED DESCRIPTION

Service providers may offer a variety of services to and/or for a client. For example, a digital data service provider may provide digital content (e.g., audio and video) to a client. Providing the content may be improved by shortening the security authentication sequence between the service provider and the client. In one implementation, this may be accomplished by a service provider providing the client with a second security token after verifying the client with a first security token. The second security token may be processed more readily by the service provider and is used in place of the first security token for subsequent requests to the service provider. Other types of service providers (e.g., content management and action initiating) may experience similar benefits.

Figure 1:
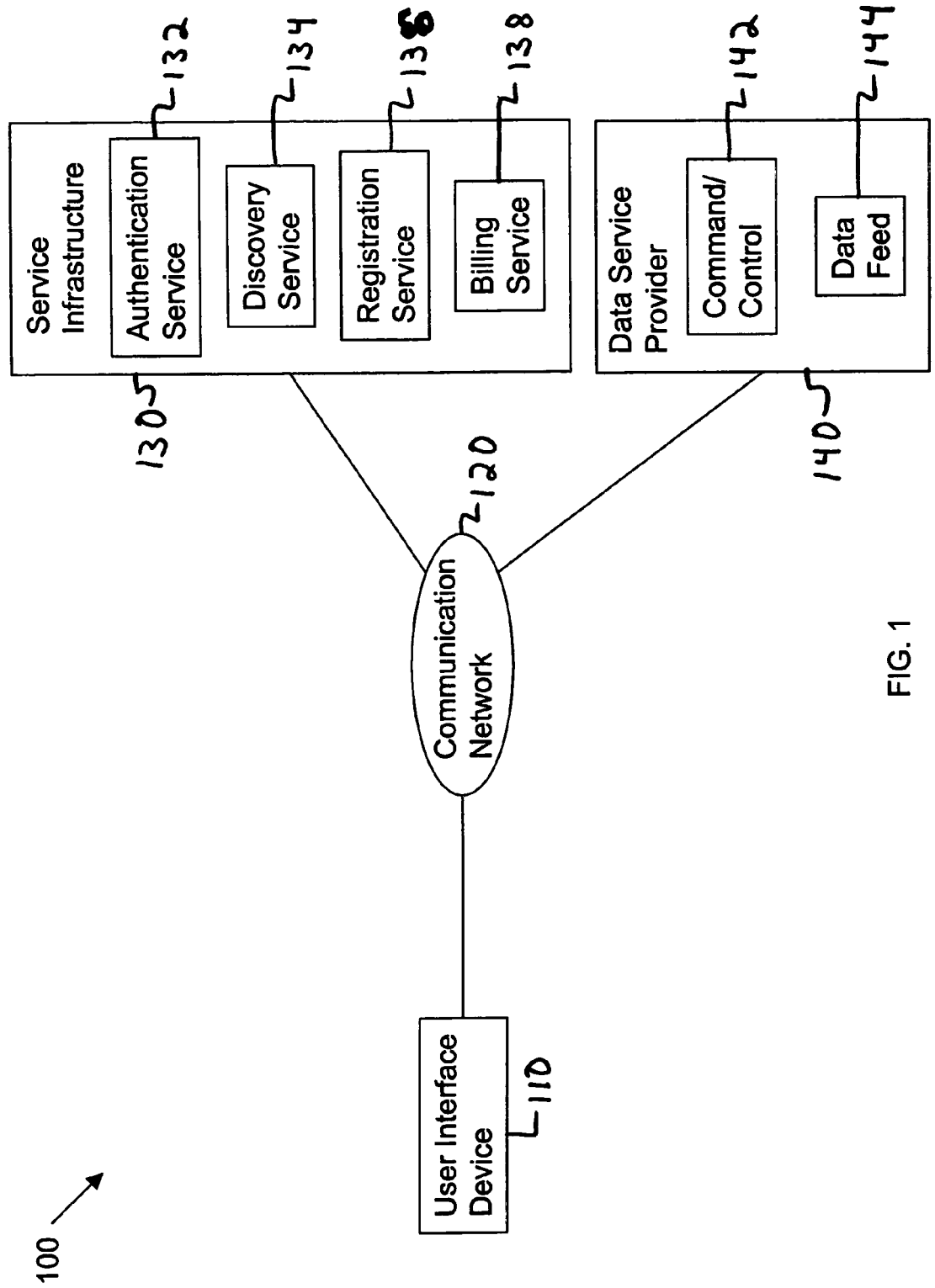
FIG. 1 is a block diagram illustrating an example system for digital data services.

FIG. 1 illustrates an example system 100 for digital data services. System 100 includes a user interface device 110, a communication network 120, a service infrastructure 130, and a service provider 140. In general, user interface device 110, which is one example of a client, allows a user to request and receive digital data from service provider 140. To accomplish this, user interface device 110 performs preliminary registration procedures with service infrastructure 130, from which the user interface device receives a security token for service provider 140. A security token may be any collection of information that may be used to validate, verify, and/or authenticate a user, a message, and/or a device. After receiving the security token, user interface device 110 requests digital data from service provider 140. Service provider 140 may, for example, be a radio service or a photo service, examples of which will be discussed below. In responding to the request for digital data, service provider 140 validates the security token sent by user interface device 110 and sends a second security token to user interface device 110. User interface device 110 then uses the second security token in place of the first security token for subsequent requests to service provider 140 during the data session. The requests and responses for establishing the session, as well as the actual data for the service, are sent across communication network 120.

In more detail, user interface device 110 may be any type of device for providing or facilitating the provision of digital data to a user. For example, user interface device 110 may be a consumer electronic device such as a multimedia device, a digital media adapter, or a digital television. System 100 is also applicable to clients running on a computer (such as a PC Radio Client). User interface device 110 may enter into a client-server relationship with service infrastructure 130 and/or service provider 140 to receive the service.

User interface device 110 typically includes a processor, memory, a network interface device, a user input device, and a user output device. The processor may be a microprocessor, a field-programmable gate array (FPGA), or any other type of device for manipulating information in a logical manner. The memory may include random access memory (RAM), read-only memory (ROM), compact-disk read-only memory (CD-ROM), and/or any other device for storing information. The network interface device may be a network interface card (NIC), a modem, a wireless transceiver, or any other type of device for sending and receiving information. The user input device may be a keyboard, a keypad, a stylus, a mouse, or any other type of device for receiving input from a user. The user output device may provide audible, visual, or other appropriate information to the user.

The communication network 120 may be any appropriate collection of components for sending information. For example, the communication network may include bridges, switches, routers, hubs, repeaters, transceivers, modems, and/or any other device for conveying information. The communication network may be a local area network (LAN), a wide area network (WAN), or the Internet. The communication network may operate using wireline and/or wireless techniques.

Service infrastructure 130 provides the core services used to identify, manage, and create user accounts, whose services are being deployed to user interface device 110. Service infrastructure 130 includes an authentication service 132, a discovery service 134, a registration service 136, and a billing service 138. Authentication service 132 is responsible for authenticating user interface device 110 when it applies for data service and generating security tokens used within the framework to obtain access to services. The authentication may take place through any of a variety of well-known techniques (e.g., X.509 certificates). Discovery service 134 is responsible for finding service providers for user interface device 110. Discovery service 134 may accomplish this based on a subscription list for the user interface device, the capabilities of the user interface, and/or the current availability of service providers. Registration service 136 is responsible for registering user interface device 110 for the service infrastructure. Registration may include establishing factual information about the owner of the user interface device, preference information for the owner of the user interface device, and the capabilities of the user interface device. Billing service 138 is responsible for tracking the use of service providers by user interface device 110 and determining the amount to charge the owner of the user interface device. The operations of several of the services in service infrastructure 130 will be discussed in more detail below.

Service provider 140 provides the actual data service to user interface device 110. Service provider 140 includes a command/control component 142 and a data feed component 144. Command/control component 142 is responsible for managing the user interface device's access to data, and data feed component 144 is responsible for actually supplying the requested data.

Service infrastructure 130 and service provider 140, and their respective components, may be implemented on one or more devices or systems. In particular implementations, service infrastructure 130 may be implemented on a first server and service provider 140 may be implemented on a second server. The servers may or may not be co-located. In certain implementations, however, service infrastructure 130 and service provider 140 may be implemented on the same server.

In one mode of operation, service infrastructure 130 and service provider 140 implement a web-services interface framework upon which service applications such as a radio service or a photo service may be built. The framework may provide for the provisioning of services to consumer electronics devices. The basic structure of the framework may be based upon existing identity-based web-services standards, such as Web Services Security and the Liberty Alliance specifications. The framework may provide the following functionality: 1) authentication (both user and device); 2) service location and authorization; 3) message security; and 4) message correlation. An application programming interface (API) may be provided for the service infrastructure and/or the service provider.

In this implementation, the Simple Object Access Protocol (SOAP) may be used to allow user interface device 110 to interact with services of service infrastructure 130 and command/control component of service provider 140. However, the data flow from the service provider may be in any appropriate format for the data. For example, if service provider 140 is a radio service, an Ultravox streaming feed may be used.

In a typical procedure, API calls are made to authentication service 132 and discovery service 134. Framework surrounding calls are made to the remaining services (including the framework for the command/control calls to the data services).

The procedure could include user interface device 120 authenticating with authentication service 132. After authentication by authentication service 132, user interface device 110 queries the location of service providers such as service provider 140 from discovery service 134, which returns the service provider location and a security token for the service provider. User interface device 110 then invokes service at that the specified service provider location using the provided security token. Typically, user interface device 110 will interact with command/control component 142 of service provider 140 over a series of messages. By doing this, a session is established with the service provider.

An example of a security token to access a data service provider that provides a radio service is:

```
<lib:Assertion MajorVersion="1" MinorVersion="2"
   AssertionID="9f3d54a0-4899-8a3d-9328-
      328ad3e4ef90"
   Issuer="http://idp.aol.com"
   IssueInstant="2003-06-06T12:10:11Z"
   InResponseTo="uuid:0023923-28329023-238239026">
   <saml:Conditions   NotOnOrAfter="2003-06-07T12:10:
      10Z">
      <saml:AudienceRestrictionCondition>
         <saml:Audience>http://radio.ws.aol.com</saml:Au-
            dience>
      </saml:AudienceRestrictionCondition>
   <saml:Conditions>
   <lib:AuthenticationStatement
      AuthenticationInstant="2003-06-06:12:10:11Z"
      SessionIndex="1">
      <lib:AuthnContext>
         <lib:AuthnContextClassRef>
            http://schemas.aol.com/authctx/classes/
            DeviceProtectedTransport
         <lib:AuthnContextClassRef>
      </lib:AuthnContext>
      <lib:Subject>
         <saml:NameIdentifier>
            <lib:NameQualifier>http://aol.com</NameQuali-
               fier>
            <lib:Format>urn:liberty:iff:nameid:
               federated<Format>
            AOLScreenname
         </saml:NameIdentifier>
         <saml:SubjectConfirmation>
            <saml:ConfirmationMethod>
               urn:oasis:names:tc:SAML:1.0:cm:Bearer
            </saml:ConfirmationMethod>
         <saml:SubjectConfirmation>
      </lib:Subject>
   </lib:AuthenticationStatement>
   <saml:AttributeStatement>
      <lib:Subject>
         <saml:NameIdentifier>
            <lib:NameQualifier>http://
               aol.com<NameQualifier>
            <lib:Format>urn:liberty:iff:nameid:
               federated<Format>
            AOLScreenname
         </saml:NameIdentifier>
      <lib:Subject>
      <saml:Attribute AttributeName="devUPC"
         AttributeNamespace="http://schemas.aol.com">
         <saml:AttributeValue>123456789012<saml:At-
            tributeValue>
      </saml:Attribute>
   </saml:AttributeStatement>
   <ds:Signature>
      Signature data goes here
   </ds:Signature>
/lib:Assertion>.
```

Upon verification, data service provider 140 may determine a security token to be used for further service requests during the session. A session may be viewed as the time period in which a user interface device is interacting with a service provider, whether or not a persistent connection is maintained. However, there may be long time periods in which the service provider does not receive any requests from the user interface device (e.g., when the service provider is steadily streaming data to the user interface device). Thus, a session may be viewed as the time in which the service provider and the user interface device are communicating, even if it is predominantly one-way, or the time in which the service provider is expecting the user interface device to interact with the service provider. For example, a security token may be valid for a given period of time. Thus, a session may be viewed as the time that a security token is valid.

An example of a session security token for the before-mentioned radio service is:

```
<aol:ServiceSessionContext
   NotOnOrAfter="2003-06-07T12:10:10Z">
   023893207akf;lkqwrtp8ywea:aasfqw;4uq4tqe4twhrwe5
   tywrwerthsadfiy3096driuqw360p7341uyerg734634tlarh02375
   uert396485twertertlq4tr9p275qwer239qqw=349y84ter
</aol:ServiceSessionContext>.
```

As demonstrated, the session security token is more readily processed than the first security token. Also, the second security token may be placed in a separate header, illustrated here as a <ServiceSessionContext> header, from the one used for the first security token. As described below, other session-related information may also be placed in the header and returned to the service provider in future service requests. In other implementations, however, the session security token may be placed, possibly in binary form, into existing headers, such as, for example, the Web Services security header.

Upon selecting a particular aspect of the service, the user interface device receives instructions for accessing the appropriate data feed. The user interface device then invokes the data feed for the service directly.

Note, however, that there may be many variations on this theme for different services and for different user environments. In some cases, for example, the discovery request may be included in the final authentication submission. In certain cases, the service provider will not have a data feed and will expose its entire set of services via the web services interface.

As mentioned previously, system 100 may be used for provisioning services to services to consumer electronic devices. The typical case is for a consumer to purchase an enabled device, plug it in, and, potentially with some personalization, access services on the device. System 100 may support both proprietary and non-proprietary services as well as the provisioning of proprietary services to both proprietary and non-proprietary users and devices, as long as they are authenticated. For example, non-proprietary ISP customers may be authenticated so that they may access proprietary services.

Some basic use cases that may be enabled are outlined below. Note, however, that this set of use cases is not expected to be comprehensive, just exemplary of what the framework may enable.

In the first case, a long-time customer of a particular service provider purchases a digital media device from an electronics store. When he plugs in the device, it asks if he is a customer of the service provider. Since he is, he responds affirmatively and provides his user authentication information to the device. The device authenticates to the service provider and downloads the customer's personalization settings for particular services (e.g., radio), extending the customer's service-provider experience to a new device.

In the second case, a new user purchases a device and plugs it in. However, she is not a customer of the service provider. Thus, when she is asked about being a customer, she replies that she is not. If she does not want to create an account at this time, she may still be able to access some services, although possibly a little more restrictive than an existing customer and without the personalizations. In the future, she may upgrade her device to receive the full personalized experience, for example, by subscribing to a stand-alone radio service.

In a third case, an existing customer purchases a premium device. When he brings it home and plugs it in, the device authenticates into the framework as itself, and the full personalized radio service (able to store user presets, access the full range of radio content, etc.) is accessed. In this case, the customer, having purchased other such devices, associates this device with his network account, and the device is able to retrieve his existing set of station presets.

Figure 2:
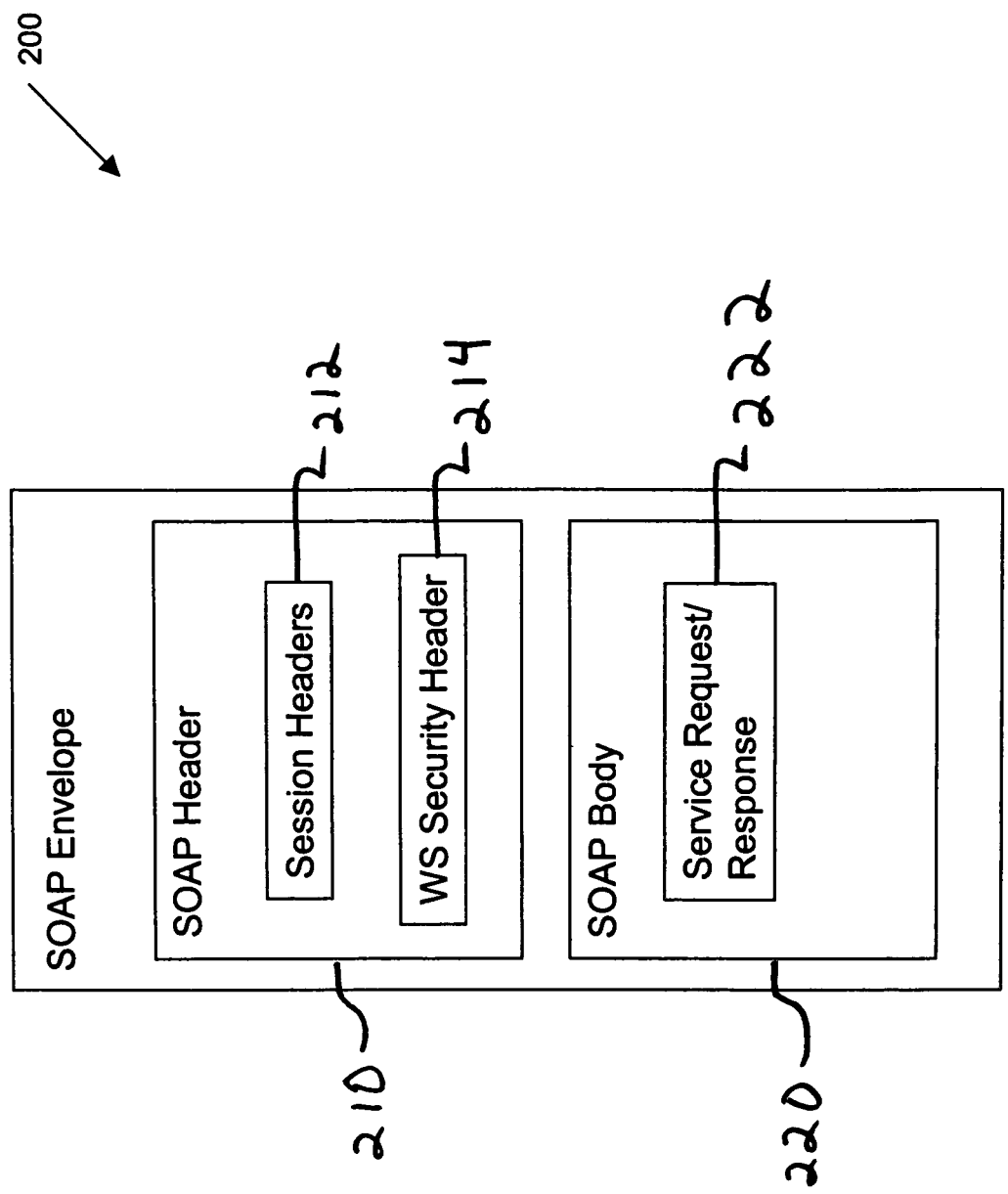
FIG. 2 is a block diagram illustrating an example message structure for digital data services.

FIG. 2 illustrates one example of a message structure 200 for providing digital data services. Message structure 200 may, for example, be used with system 100 in FIG. 1. As such, message structure 200 may be used for a framework API. In particular implementations, the message structure is based upon the Liberty Alliance specifications, with added extensions.

As may be seen in FIG. 2, message 200 include two main portions—a header section 210 and a body section 220. Header section 210 includes session headers 212 and a web-services security header 214, which contain message and user/device identification and security information, and body section 220 includes a service request/response 222, which contains the actual request/response for the service. A response is very similar to a request, except that it usually does not contain a security header 214.

Header section 210 may include a correlation header—<Correlation>. A <Correlation> header contains the message identity information for the message, such as the message identifier, timestamp, etc. The header may have the attributes shown in Table 1. A sample <Correlation> header is:
    <sb:Correlation s:mustUnderstand="1"
    messageID="uuid:efef-adadef- . . . "
    timestamp="2003-06-12T18:12:11Z" />.

TABLE 1

Example <Correlation> Header Attributes

| Attribute | Usage |
|---|---|
| mustUnderstand | Set to "1" |
| messageID | Set to a unique identifier for each message |

TABLE 1-continued

Example <Correlation> Header Attributes

| Attribute | Usage |
|---|---|
| refToMessageID | On response messages, set to the value contained in the messageID attribute of the <correlationType> header in the request. |
| timestamp | Time message was generated |

Header section 210 also may include a device-type header—<DeviceType>. A <DeviceType> header is used to identify the device software making the request. This information is used for statistical purposes, as well as to validate the sanity of the request (for example, a request to access a billing service on a device that has no e-commerce capabilities will likely be refused). The header may have the attributes shown in Table 2. A sample <DeviceType> header is:
    <aol:DeviceType man="AOL" name="AIM.exe" version="5.1"/>.

TABLE 2

Example <DeviceType> Header Attributes

| Attribute | Type | Usage |
|---|---|---|
| man | Required | The manufacturer of the client or device. |
| name | Required | The name of the client or device. For devices, this is usually the model number of the device |
| version | Optional | The version of the device software |

Note that some applications may use an inappropriate <DeviceType> header in an attempt to impersonate a user interface device. Therefore, it is the better security practice that this information be "trusted."

Header section 210 additionally may include a redirect-to header—<RedirectTo>. A <RedirectTo> header is used to redirect the user interface device to a new endpoint for subsequent requests for a service. There are several instances where this may be used, including: 1) to direct the requestor to the specific server within a server farm that handles the requests associated with a "session" or perhaps with a "user"; and 2) to migrate an existing "session" or user to a new server (perhaps because of maintenance on the current server). Note that the term "session" may be whatever the server thinks of as a session. The <RedirectTo> header basically allows the server to direct the requestor to a specific entry point for further communications. The header may have the attributes shown in Table 3. An example <RedirectTo> header is:
    <aol:RedirectTo mustUnderstand="1"
    endPoint="https://server4.cluster2.ws.aol.com"/>.

TABLE 3

Example <RedirectTo> Header Attributes

| Attribute | Type | Usage |
|---|---|---|
| mustUnderstand | Required | Set to "1" |
| endPoint | Required | The new endpoint for subsequent messages. This may be a complete URL pointing to the location where subsequent messages for this service should be submitted. |

The service may reject the current request in conjunction with returning a <RedirectTo> header, essentially telling the user interface device to resubmit its request to the new "endPoint". In such a case, the server may return a SOAP fault with <S:faultcode> set to "Client.EndPointChange.ReSubmit". An example response for this case is:
```
<S:Envelope xmlns:S="http://schemas.xmlsoap.org/soap/envelope/">
    <S:Header>
        <sb:Correlation S:mustUnderstand="1"
            messageID="uuid:0023923-28329023-238239023"
            refToMessageID="uuid:00123-ad32-23-09923-
                88239"
            timestamp="2003-06-06T12:10:10Z"/>
        <aol:RedirectTo mustUnderstand="1"
            endPoint="https://server4.cluster2.ws.aol.com"/>
    <S:/Header>
    <S:Body>
        <S:Fault>
            <faultcode>Client.EndPointChange.Resubmit</
                faultcode>
            <faultstring>
                You must resubmit this request to the new endpoint.
            </faultstring>
        </S:Fault>
    </S:Body>
</S:Envelope>.
```

Header section 210 may further include a service-session-context header—<ServiceSessionContext>. This header may be used to return session-context information to a service that has passed such information in a previous response. In general, when a service returns a <ServiceSessionContext> header, the user interface device should use the context in subsequent calls to the same service. Typically, this information is not included on the initial request. However, the service may, upon processing the initial request, return a context definition in the response that should be used on subsequent requests to the same service provider.

The <ServiceSessionContext> header may be used to allow a service to cache session information (e.g., session identifiers and system identifiers) and authentication information in the user interface device in a native format for the service. For example, the device may store state information when interacting with a Web site (e.g., cart status). This may allow the device to operate in a server independent format. (In implementations in which the state information is stored on a server, a session ID may be created in the server that indexes to the state information of the service.) The service may take steps to protect this information from use and manipulation at the device (typically, through some form of encryption/hashing).

Note that the <ServiceSessionContext> header may change for each request (i.e., the service may return a new session context on each response, and this context should be used for the next service request). Table 4 illustrates example attributes of the header. An example <ServiceSessionContext> header is:
```
<aol:ServiceSessionContext mustUnderstand="1"
NotOnOrAfter="2003-10-06T09:30:20Z">
session data goes here (typically base64 encoded binary
    data)<
/aol:ServiceSessionContext>.
```

TABLE 4

Example <ServiceSessionContext> Header Attributes

| Attribute | Type | Usage |
|---|---|---|
| mustUnderstand | Required | Set to "1" |
| NotOnOrAfter | Optional | Specifies the time instance after which the session context will no longer be accepted by the provider. This does not need to be included on the subsequent request as it is advisory data for the client. |

A <ServiceSessionContext> may become invalid for many reasons, including an expiration of the validity period or a service-side session cancellation. In such a case, the service may return a SOAP error to the user interface device with <S:faultcode> set to "Client.ServiceSessionContext.Invalid". An example of such a response is:
```
<S:Envelope xmlns:S="http://schemas.xmlsoap.org/soap/envelope/">
    <S:Header>
        <sb:Correlation S:mustUnderstand="1"
            messageID="uuid:0023923-28329023-238239023"
            refToMessageID="uuid:00123-ad32-23-09923-
                88239"
            timestamp="2003-06-06T12:10:10Z"/>
    <S:/Header>
    <S:Body>
        <S:Fault>
            <faultcode>Client. ServiceSessionContext.Invalid</
                faultcode>
            <faultstring>Invalid Session Context</faultstring>
        </S:Fault>
    </S:Body>
</S:Envelope>.
```

The recovery from such an error may depend upon several factors. In one implementation, the user interface device first checks the validity period for the security token that the user interface device initially received for the service being invoked. If the token is still valid, the user interface device resubmits the request with the token. If the token is not still valid, or if the resubmission does not work, the user interface device checks the validity period for the security token obtained during the initial authentication process. If that token is still valid, the user interface device submits a discovery service request to obtain a new service security token and then invokes the service again. If, however, the validity period of both tokens has expired, the user interface device starts over with an initial authentication. The user interface device may avoid expired validity periods by using a security-token renewal process, an example of which is described later.

Header section 210 also includes web-services security header 214—<wsse:Security>. A <wsse:Security> header may be used to identify and authenticate a user to the service. An example <wsse:Security> header is:
```
<wsse:Security>
<saml:Assertion        xmlns:saml="urn:oasis:names:tc:
    SAML:1.0:assertion"
    AssertionID="2323sadf2asdf8h9423h"
    Issuer="discovery.aol.com">
...
</saml:Assertion>
</wsse:Security>.
```

The framework may use Liberty Alliance assertions as the security tokens for securely transferring identity information to the various services, including information about when, where, and how a user was authenticated, as well as her identity at the service. An example security token, in this case a token generated for the discovery service by the authentication service, is:
```
<lib:Assertion MajorVersion="1" MinorVersion="2"
AssertionID="e06e5a28-bc80-4ba6-9ecb-712949
    db686e"
Issuer="http://idp.aol.com"
IssueInstant="2003-09-29T09:30:47Z"
InResponseTo="4e7c3772-4fa4-4a0f-99e8-
    7d719ff6067c">
<saml:Conditions    NotOnOrAfter="2003-09-30T09:30:
    47Z">
```

```
<saml:AudienceRestrictionCondition>
    <saml:Audience>http://discovery.aol.com</saml:
        Audience>
</saml:AudienceRestrictionCondition>
</saml:Conditions>
<lib:AuthenticationStatement
    AuthenticationInstant="2003-09-29T09:30:20Z"
    SessionIndex="1">
    <lib:AuthnContext>
        <lib:AuthnContextClassRef>
            http://www.projectliberty.org/schemas/authctx/
                classes/
            PasswordProtectedTransport
        </lib:AuthnContextClassRef>
    </lib:AuthnContext>
    <lib:Subject>
        <saml:NameIdentifier>
            <lib:NameQualifier>http://aol.com</NameQuali-
                fier>
            <lib:Format>urn:liberty:iff:nameid:federated</
                Format>
            AOLScreenname
        </saml:NameIdentifier>
        <saml:SubjectConfirmation>
            <saml:ConfirmationMethod>
                urn:oasis:names:tc:SAML:1.0:cm:Bearer
            </saml:ConfirmationMethod>
        </saml:SubjectConfirmation>
    </lib:Subject>
</lib:AuthenticationStatement>
<saml:AttributeStatement>
    <lib:Subject>
        <saml:NameIdentifier>
            <lib:NameQualifier>http://aol.com</NameQuali-
                fier>
            <lib:Format>urn:liberty:iff:nameid:federated</
                Format>
            AOLScreenname
        </saml:NameIdentifier>
    </lib:Subject>
    <saml:Attribute AttributeName="ParentalControl"
        AttributeNamespace="http://schemas.aol.com">
        <saml:AttributeValue>MatureTeen</saml:At-
            tributeValue>
    </saml:Attribute>
</saml:AttributeStatement>
<ds:Signature>
    Signature data goes here
</ds:Signature>
</lib:Assertion>.
```

Although this structure contains a relatively large amount of data, the basic paradigm is that the assertion includes several statements about the "Subject," which, in this case, is the user. Those statements include authentication statements, attribute statements, and authorization decision statements. An authentication statement defines how and when the user was authenticated, and certain implementations may have one of these statements in each assertion. An attribute statement defines attributes of the user, and certain implementations will use this to set data for the user, such as a parental control settings. An authorization decision statement contains authorization information about the user, typically for the service being invoked.

The Liberty Alliance assertion, which is based upon the Security Association Markup Language (SAML) assertion, contains a large number of optional parameters and settings that are useful in many circumstances. Thus, many implementations are possible with respect to the fields available within the structure.

For example, within the <Conditions> element, the "NotBefore" element may not be used. Instead, the "IssueInstant" element found in the surrounding <Assertion> element may be used as the beginning of the validity period for the assertion.

As another example, within the <Subject> element, the <SubjectConfirmation> element may not be used. Security tokens may, for instance, be bearer tokens.

As a further example, within the <NameIdentifier> element, with proprietary provided services, the Liberty Alliance affiliation concept may be used. Thus, in general, the <NameQualifier> element will be "http://<name of proprietary service provider>.com" (i.e., the affiliation for the user), and the <Format> will be "urn:liberty:iff:nameid:federated".

When the service provider is a proprietary service, the <NameIdentifier> element may hold the user's screen name (e.g., a proprietary service account) or an alternative identifier for the user that is valid at that service. For non-proprietary service providers, this field may contain Liberty Alliance compliant pseudonyms for the user at that service.

For proprietary service accounts, the user's parental controls status, if available, may be included in an <AttributeStatement> within the assertion. Note that because of the way that this is defined in SAML, the same <Subject> element is repeated here since this is a different statement from the <AuthenticationStatement>. The valid settings for this could include "Kids Only", "Young Teen", and "Mature Teen." If this attribute is not present, the account may be unrestricted. An example statement is:

```
<saml:Attribute AttributeName="ParentalControl"
    AttributeNamespace="http://schemas.aol.com">
    <saml:AttributeValue>Mature Teen</saml:At-
        tributeValue>
</saml:Attribute>.
```

The interpretation of this statement may be defined by service provider service rules in general and the service provider itself.

When device authentication, which will be discussed in more detail below, is used, a product code (e.g., the universal product code (UPC)) for the device may be included in an <AttributeStatement> within the assertion generated for the discovery service. It may, however, be excluded in subsequent authentication events.

In particular implementations, a specialized authentication context may be used when a specific device that has been associated with a user account has authenticated over a protected transport (e.g., TLS). Such an authentication context is available from AOL as a schema entitled "AssociatedDeviceProtectedTransport." This token may be used when the device has initiated device authentication. One of the existing Liberty Alliance authentication contexts may also be used.

For data validation, assertions may be signed by the issuer (e.g., the authentication authority). As with the Liberty Alliance specifications, signed XML entities may adhere to the "XML Signature Profile" constraints.

In certain implementations, keyed-hash message authentication code (HMAC) digital signatures may be used for sameissuer to same-provider assertions. To implement this, calls similar to those in user-agent service (UAS) for maintaining signatures may be used. In other implementations, public-key signatures may be used. In particular implementations, besides the assertion itself, messages may not be signed. For example, the assertion may be treated as a bearer token, and the communications path and the bearer may be trusted to ensure that the token is not stolen.

Because of its flexibility, SOAP-implemented request and response messages may have a variety of formats. An example of a SOAP-implemented request message is:

```
<?xml version="1.0" encoding="utf-8" ?>
<S:Envelope
    xmlns:S="http://schemas.xmlsoap.org/soap/envelope/"
    xmlns:aol="http://schemas.aol.com/soap/devices-1.0"
    xmlns:sb="urn:liberty:wsf:soap-bind:1.0"
    xmlns:wsse="http://schemas.xmlsoap.org/ws/2002/06/
        secext">
  <S:Header>
    <sb:Correlation S:mustUnderstand="1"
        messageID="uuid:00123-ad32-23-09923-88239"
        timestamp="2003-06-06T12:10:10Z"/>
    <aol:DeviceType name="DMA Device" man="AOL"
        version="1.0"/>
    <wsse:Security>
      <saml:Assertion  xlmns:saml="urn:oasis:names:tc:
          SAML:1.0: assertion"
          AssertionID="2323sadf2asdf8h9423h"
          Issuer="discovery.aol.com"
          . . .
      </saml:Assertion>
    </wsse:Security>
  </S:Header>
  <S:Body>
      Request Messages go here
  </S:Body>
</S:Envelope>.
```

An example of a SOAP-implemented response message that is sent in response to the request message is:

```
<?xml version="1.0" encoding="utf-8" ?>
<S:Envelope
    xmlns:S="http://schemas.xmlsoap.org/soap/envelope/"
    xmlns:aol="xxxxxxx"
    xmlns:sb="urn:liberty:wsf:soap-bind:1.0"
    xmlns:wsse="http://schemas.xmlsoap.org/ws/2002/06/
        secext">
  <S:Header>
    <sb:Correlation mustUnderstand="1"
        messageID="uuid:0023923-28329023-238239023"
        refToMessageID="uuid:00123-ad32-23-09923-
            88239"
        timestamp="2003-06-06T12:10:10Z"/>
    <aol:ServiceSessionContext mustUnderstand="1">
      Session Context Information here (base64 encoded)<
      aol:ServiceSessionContext>
  </S:Header>
  <S:Body>
      Response data goes here
  </S:Body>
</S:Envelope>.
```

The response message is thus tied to the request message. However, there may be several differences between the request and the response. For example, the messageID attribute data from the request is contained within the refToMessageID attribute in the response. This is how requests and responses are paired together. As another example, the response includes its own messageID attribute, should the recipient (i.e., the requestor) need to refer to this message in a subsequent message to the other device. Also, there is no <wsse:Security> header in a response. The response only goes to the requestor, so there is no need to authenticate the user back to the requestor. As a further example, the response includes a <ServiceSessionContext> header, which may be included on subsequent requests made to the same service provider.

Body section 220 of message 200 includes the service request and/or the response to such a request. The individual requests are identified and responses are defined by each respective service.

For enhanced security, messages may be submitted over a secure channel, typically Secure Sockets Layer (SSL), such that they are not susceptible to man-in-the-middle attacks and they do not expose potentially dangerous information. Replay attacks may be prevented through the combination of the SSL-protected communications path in conjunction with non-reusable message identifiers in the correlation header of each message.

In particular implementations, an authentication service validates the authentication credentials provided by the user interface device and generates security tokens used within the framework to obtain access to services. The authentication process takes place over a series of messages and varies depending upon whether a user or a user interface device is being authenticated. The authentication may be based on the Liberty Alliance's Simple Authentication and Security Layer (SASL) authentication specification, although various clarifications/extensions may be used.

For example, the supported authentication methods may be limited (e.g., CRAM-MD5, SECURID, and PLAIN). Also, the authentication process may be extended, with the inclusion of a new element <AuthRequest>, which may contain the authentication request (wrapping the SASLRequest). This element may contain the attributes shown in Table 5.

TABLE 5

Sample Attributes for Authentication Request

| Attribute | Type | Usage |
| --- | --- | --- |
| User | Optional | Specifies the "name" of the entity that is to be authenticated in this session. For a user, this would typically be their login ID. This is used when the authentication technique will vary on a user-by-user basis and the server may use this information to specify to the client which authentication method should be selected (for example, a user may have specified that they should be authenticated using a SecurID method while other users use a simple password mechanism). |
| devUPC | Optional | Specifies the UPC code for a device (which uniquely identifies the manufacturer and model of device). This is only included when the device itself is authenticating to the service (as opposed to a user authenticating on the device). |
| DevSN | Optional | The serial number for the device being authenticated. This should be present if "devUPC" is specified. The value should be unique for all devices claiming the same UPC code. |
| Renew | Optional | If present and set to true, this indicates that the request is a token renewal request and the expiring token should be included on the request within the SOAP headers. The server need not fulfill the renewal request, at which time the device should initiate a new authentication process. When a renewal is requested, no other information within the <AuthRequest> is needed. |

For an authentication token renewal, the <AuthRequest> element may have the "renew" attribute set to true and no sub-elements. Otherwise, <AuthRequest> element may have one <SASLRequest> element and may contain zero or more <PasswordProc> elements.

The contexts/usage for the <PasswordProc> element is described in more detail below. In general, the <PasswordProc> elements are used on a request when the requested authentication method is a "proof-of-possession" type of authentication, and the service has implemented some level of password massaging prior to performing a comparison. Without the <PasswordProc> directives, password-based authentication may be restricted to PLAIN, so that the service may perform the massaging itself.

A new header element—<AuthResponse>—may be added to contain the service response to the <AuthRequest>. The response may include one <SASLResponse> and may include zero or more instances of the <PasswordProc> element that is described below.

The <PasswordProc> directives are designed to allow both the requestor and the responder to use the same rules for processing the password prior to using the password in the authentication calculations. If both sides are not using the same directives, it is likely that the two will have trouble matching the data in proof-of-possession type authentication methods. Table 6 illustrates the attributes that may be used when password processing is needed. However, if neither side does any processing and uses the literal input provided by the user, none of these directives may be necessary. In these instances, the <PasswordProc> element may be omitted.

TABLE 6

Example Attributes for Password Processing Element

| Directive | Usage |
|---|---|
| Truncate | Truncate the password to the specified length. The following attributes may be supported: |

| Attribute | Type | Usage |
|---|---|---|
| length | Req. | The length at which the password is truncated. |
| order | Opt. | Specifies the relative order in which the directive should be processed. |

| | |
|---|---|
| | Example: <Truncate length = "8" /> which will truncate the password to 8 characters. |
| LimitTo | Limit the characters in the password to the characters specified in the list, dropping all others. The following attributes may be supported: |

| Attribute | Type | Usage |
|---|---|---|
| list | Req. | The list of allowed characters in the password. Any characters entered by the user that are not in this list will be dropped. |
| order | Opt. | Specifies the relative order in which the directive should be processed. |

| | |
|---|---|
| | Example: <LimitTo list = "[a-z][0-9]" /> which limits the output to lower case alphabetic and numeric characters. If the user entered "Th*5Pass", and this was the only directive, the password used would be "h5ass". The data in these lists should be entitized according to the XML specification (e.g., " " for an ASCII space). |
| Map | Map (convert) characters in one list to the characters in the same relative position in a second list. This is frequently used to do things like map upper case characters to lower case or map non-printable characters to printable characters. In general, it is usually better from a security point of view to map characters |

TABLE 6-continued

Example Attributes for Password Processing Element

| Directive | Usage |
|---|---|
| | using this directive rather than dropping characters using the "LimitTo" directive. The following attributes may be supported: |

| Attribute | Type | Usage |
|---|---|---|
| FromList | Req. | The characters to be mapped. If a character in this list appears in the password, it is replaced with the character in the same relative position in "toList". |
| ToList | Req. | The list of replacement characters. |
| Order | Opt. | Specifies the relative order in which the directive should be processed. |

| | |
|---|---|
| | The data in these lists should be entitized according to the XML specification (e.g. " " for an ASCII space). Both lists may also contain ranges specified using the form "[range_start-range_end]" (e.g. "[a-z]" to mean the range of characters from "a" to "z"). Both lists may have the exact same number of characters (following decoding and range expansion). Example: <Map fromList = "[A-Z]" toList = "[a-z]" /> will map all upper case ASCII characters to lower case. |
| None | Explicit indication that no password processing is needed or supported. This is typically used by the user interface device when initiating an authentication where it is unable to support any of the password processing rules (so the service should choose a mechanism that does not require such processing). |

The directives should be applied in the order specified in the "order" attribute (e.g., if truncate is first in the list, truncation is performed before applying subsequent rules). If the "order" attribute is missing, or if there are multiple elements that have the same value for "order", the order in which those elements are processed relative to each other is undefined. Otherwise, the element with the lowest relative value will be processed first, followed by the element with the next lowest value.

An example set of process directives is:
<PasswordProc>
<Map fromList="[A-Z]" toList="[a-z]" order="1"/>
<LimitTo list="[a-z][0-9]" order="2"/>
<Truncate length="8" order="3"/>
</PasswordProc>.

This will map upper-case alphabetic characters to lower case, then remove all non-alpha-numeric characters, and finally truncate the password to eight characters. This is a common password normalization and may be used in order to perform a "proof-of-possession" type authentication with such an account.

Additionally, the SASL mechanisms in the <SASLResponse> may be moved from the value area of the element to a "mechanism" attribute. Thus, it does not conflict with the location of challenge data that may be stored in the value area of the response.

Authentication security tokens generated by the authentication service may have relatively short validity periods. The periods may typically be much shorter than some of the user interface device sessions (e.g., even with tokens good for 24 hours, many devices may be "always-on" and, thus, never "log-out"). The user interface device has several options to deal with this situation, for example, re-authentication and renewal. For re-authentication, when the user interface device needs to invoke further services and the validity period has expired, the user interface device initiates the authentication process again to obtain a new security token, by again presenting the authentication credentials. For renewal, the user interface device submits a renewal request to the authentication service, which should take place before the end of the validity period for the token, although the authentication service may choose to accept an expired token within a narrow window following the validity period. The user interface device is expected to monitor the validity period of the security tokens obtained through the authentication process, and, if it needs to continue operations in which it would submit requests beyond the defined period, the user interface device should submit a renewal prior to the expiration of the validity period. Because different systems may have time clocks that are out of sync, the renewal request should be submitted early enough to reasonably ensure that time-sync issues do not cause a failure for the renewal. If a renewal fails, perhaps because the service has chosen not to renew the request (e.g., the service may choose to only renew a token X times), and the user interface device does have a request that it needs to submit, the device will need to initiate the full authentication process to re-authenticate using its credentials.

User authentication may be handled somewhat differently than device authentication. For consumer electronic devices, user authentication is typically only needed for the device registration step and will frequently be performed by the user via some alternative means (e.g., web registration or phone registration). Once the device is associated with a user account, most actions will probably take place via the device authentication process. But there may be cases, such as high-valued transactions like product purchases, where a user authentication may be necessary even though the device has already been authenticated, and there may be advanced devices that will perform the device association process directly. Thus, user authentication should be supported by the service.

The user authentication process varies depending upon the information known by the user interface device at the time the authentication is initiated. For example, the user interface device may have authenticated the user to the same authentication service previously; hence, the user interface device would likely remember how the user authenticated previously and attempt to perform the same authentication again directly, rather than negotiating the type of authentication to be used.

The following discussion illustrates an example of the negotiation process that could be performed for the initial authentication on a particular user interface device and how this could change for subsequent authentications on the same user interface device. The negotiation process involves a series of messages in which the method of authentication is negotiated and the appropriate credentials are provided to authenticate the user. In the example, the data that would be contained in the body of the SOAP message is shown. Other data, such as that in the SOAP headers (e.g., the correlation header) is removed for brevity. Later examples will show a complete set of messages, including the SOAP bindings.

When beginning to request a service, the user interface device initiates an authentication with the authentication service, typically with the mechanism attribute set to a list of supported methods. An example of the message is:
    <aol:AuthRequest user="Conor">
    <SASLRequest mechanisms="CRAM-MD5 PLAIN"/>
    </aol:AuthRequest>
In this case, the user interface device is informing the service that the user interface device is attempting to authenticate the user "Conor" and that it supports the two specified authentication mechanisms (i.e., CRAM-MD5 and PLAIN).

The authentication service responds to the user interface device with a message indicating the method that it has selected to be used for authentication in the mechanism attribute (e.g., mechanism="CRAM-MD5"). If the method requires a challenge value, the challenge may be included, possibly with base-64 encoding, as the value of the <SASL-Response> sub-element.

The authentication service may also include one or more password processing directives in the response in the <PasswordProc> element in the <AuthResponse> element. An example <AuthResponse> element is:
    <aol:AuthResponse>
    <PasswordProc>
        <Map fromList="[A-Z]" toList="[a-z]" order="1"
        <LimitTo list="[a-z][0-9]" order="2"/>
        <Truncate length="8" order="3"/>
    </PasswordProc>
    <SASLResponse mechanisms="CRAM-MD5">
        <Status code="continue"/>
        923992ad4d2 . . .
    </SASLResponse>
    </aol:AuthResponse>.
In this example, the authentication service has requested the "CRAM-MD5" authentication mechanism and has asked that the user interface device perform several password massages prior to using the password in the authentication mechanism.

The user interface device processes the password as indicated by the service and returns the results to the server. An example of the authorization request is:
    <aol:AuthRequest>
    <SASLRequest mechanisms="CRAM-MD5">
        A87B3237d73282 . . .
    </SASLRequest>
    </aol:AuthRequest>.
Note that a single mechanism is specified and that the user interface device is using that mechanism (i.e., CRAM-MD5). The <Correlation> header may contain the message ID of the previous message so that the authentication service will be able to associate this request with the service's prior response, which included the challenge data.

The authentication service then validates the credentials provided by the user interface device and generates a security token to be used for subsequent requests from the device. The security token and discovery service bootstrap are then provided to the device. An example of this response is:
    <aol:AuthResponse>
    <SASLResponse>
        <Status code="success"/>
        <Credential>
            <lib:Assertion ID="1">
            </lib:Assertion>
        </Credential>
        <ResourceOffering>
            <ResourceID>urn:liberty:isf:implied-resource</ResourceID>
            <ServiceInstance>
                <ServiceType>urn:liberty:disco:2003-08</ServiceType>
                <ProviderID>http://discovery.aol.com</ProviderID>
                <Description CredentialRef="1">
                    <SecurityMechID> . . . </SecurityMechID>
                    <Endpoint>https://discovery.aol.com</EndPoint>
                </Description>
            </ServiceInstance>
        </ResourceOffering>
    </SASLResponse>
    </aol:AuthResponse>.
In this example, the status code of "success" indicates that the authentication process is complete and that it has been successful. The <Credential> element contains the authentication token to be used for subsequent requests requiring user authentication, such as the discovery service. It may also be submitted back to the authentication service when it is about to expire. The <ResourceOffering> element contains the information necessary to invoke the discovery service, which is described below.

At some point later, preferably prior to the token's expiration, the user interface device may submit a renewal request. An example renewal request is:

<aol:AuthRequest renew="true"/>.

The actual tokens being renewed may be incorporated into the message header in the same fashion used by other post-authentication service requests, such as a discovery service request. In response, the security token and discovery service bootstrap are provided to the user interface device. The basic difference with the token returned in response to this request and the one returned earlier is that the validity period for the assertion will have changed to indicate the renewed status.

It should be noted that there are different ways to perform the authentication operations. However, in many cases, especially those that are designed around a challenge-response mechanism, the operations just discussed may be required.

In the case of authentication methods that do not require the service-provided challenge, such as PLAIN, the user interface device may initiate the process directly to the service with an <AuthRequest> that submits the information on the first message. For example, the following message initiates a PLAIN authentication:

<aol:AuthRequest>
<SASLRequest mechanisms="PLAIN">
UserID%00%00Password
</SASLRequest>
</aol:AuthRequest>.

This request would advance the procedure to service validation, followed by, presumably, a successful return of the security tokens. Note that the PLAIN authentication method may only be used when the security of the messages is well protected, such as with a Transport Layer Security (TLS).

Device authentication may differ from user authentication in that it is the device itself that is being authenticated and then provided with access to services that the user has associated with that device. This may prevent the user interface device from having to store user credentials and provides the user interface device access to the services for which the user has performed an association. The device association process may be performed by one of a variety of well-known techniques.

Each user interface device may be uniquely identified in order for the authentication to be more secure. The Universal Plug and Play (UPnP) recommendation of using a UPC code in conjunction with a serial number to identify the device may provide such an identification scheme. In this implementation, the device serial number should be non-volatile and not changeable by the user.

In cases where the serial number is not available electronically, the device may use the hardware assigned Media Access Control (MAC) address of the network interface as its serial number. In such a case, the device should ensure that it always uses the MAC address from the same network interface and that the user cannot change the value used by the device. If the device allows the user to change the MAC address, as many routers do, the user interface device may use the originally-assigned MAC address as its identifier, even though it may be using a user-assigned MAC address on the network.

With more advanced devices, such as those that contain a smart card or those that have an embedded X.509 certificate, the device may be identified using information in the certificate/smart card.

In general, user interface devices may use any of the available authentication methods to authenticate. The specific method chosen will depend upon the capabilities of the device (e.g., whether or not it has an X.509 certificate).

Devices not containing enhanced security tokens that may be used for authentication may be authenticated using a password assigned to the manufacturer for that specific model of device (on a per-UPC code basis). Such devices may use the CRAM-MD5 algorithm for authentication.

For the authentication process for a device using the assigned password authentication, the device may initiate an authentication with the authentication server, usually with the mechanism attribute set to a list of supported methods. An example of the message body is:

<aol:AuthRequest devUPC="123456789012" devSN="132398239">
<SASLRequest mechanisms="CRAM-MD5 PLAIN"/>
</aol:AuthRequest>.

In this case, the user interface device is informing the authentication service that the user interface device is attempting to authenticate itself and that it supports the two specified authentication mechanisms (e.g., CRAM-MD5 and PLAIN).

In the case where the user interface device supports multiple users, such as a stereo receiver that has a different set of presets and stations for different users, the device may include the "user" attribute on the request to specify the user who is attempting to access the service at this point. In such a case, a request may look something like:

<aol:AuthRequest user="Conor" devUPC="123456789012" devSN="132398239">
<SASLRequest mechanisms="CRAM-MD5 PLAIN"/>
</aol:AuthRequest>.

As mentioned before, the difference is that user="Conor" has been included in the <AuthRequest> element.

The authentication service responds to the user interface device with a message indicating the method that the service has selected for authentication in the mechanism attribute (e.g., mechanism="CRAM-MD5"). If the method requires a challenge value, the challenge, typically base-64 encoded, may be provided as the value of the <SASLResponse> sub-element. The authentication service may not use any <PasswordProc> directives when authenticating a device. An example <AuthResponse> is:

<aol:AuthResponse>
<SASLResponse mechanisms="CRAM-MD5">
<Status code="continue"/>
923992ad4d2 . . .
</SASLResponse>
</aol:AuthResponse>.

In this case, the authentication server has requested the "CRAM-MD5" authentication mechanism.

The user interface device may then perform the next step in the authentication mechanism providing authentication proof to the authentication service. For the above example, the device processes the challenge data with the password and submits a new request to the service, which includes the results of that process. An example of this request is:

<aol:AuthRequest>
<SASLRequest mechanisms="CRAM-MD5">
A87B3237d73282 . . .
</SASLRequest>
</aol:AuthRequest>.

In this request, a single mechanism is specified, indicating that this is a continued authentication process and that the device is using that mechanism ("CRAM-MD5", in this case). The <correlation> header may contain the message ID of the message from the previous step so that the authentication service will be able to associate this request with its prior response, which included the challenge data.

The authentication service may then validate the credentials provided by the device, generate a security token to be used for subsequent requests from the device, and provide the security token to the device. An example of a message conveying a security token and discovery service bootstrap to the device is:

```
<aol:AuthResponse>
  <sa:SASLResponse>
    <sa:Status code="success"/>
    <sa:Credential>
      <lib:Assertion ID="1">
        Assertion data goes here.
      </lib:Assertion>
    </sa:Credential>
    <disco:ResourceOffering>
      <disco:ResourceID>urn:liberty:isf:implied-re-
        source</disco:ResourceID>
      <disco:ServiceInstance>
        <disco:ServiceType>
          urn:liberty:disco:2003-08
        </disco:ServiceType>
        <disco:ProviderID>
          http://discovery.aol.com
        </disco:ProviderID>
        <disco:Description CredentialRef="1">
          <disco:SecurityMechID> . . . </disco:Security-
          MechID>
          <disco:Endpoint>
          https://discovery.aol.com
          </disco:EndPoint>
        </disco:Description>
      </disco:ServiceInstance>
    </disco:ResourceOffering>
  </sa:SASLResponse>
</aol:AuthResponse>.
```

In this example, the status code of "success" indicates that the authentication process is complete and that it has been successful. Also, the <Credential> element contains the authentication credential to be used for subsequent requests requiring user authentication, typically of the discovery service. It may also be submitted back to the authentication service for renewal. The <Assertion> element contains the user's identity at the discovery service. Note even in the case of a device authentication, it may be a user's identity that is contained within the assertion, the device authentication being considered an authentication of the user that associated the device with his identity. The assertion also contains an authentication context that shows it is based upon an associated device authentication.

Service discovery may then be performed. Service discovery allows the user interface device to determine how to communicate with the service provider and to obtain the token(s) necessary to authenticate the user at that service.

The process and protocols may, in general, be based upon the Liberty Alliance discovery service and security techniques. In certain implementations, various procedures may be made used. For example, requests may return security credentials to be included on the subsequent service requests. Once a connection has been established to a particular service, this may be accomplished by using a <ServiceSessionContext>, to maintain information for subsequent requests in the same session. For certain services, the <ResourceID> element may contain "urn:liberty:isf:implied-resource" because the security token in the header will identify the resource being accessed. This may allow <EncryptedResourceID> element not to be used. However, devices may pass whichever of these elements appears in the <ResourceOffering> to the service being invoked. As a further example, a different security mechanism may be used. This security mechanism may use TLS to authenticate the service and to provide confidentiality of the messages while a bearer token is used to authenticate the message itself. Such a security mechanism is available from AOL.

In certain implementations, the <Modify> entry point, nor its <InsertEntry> and <RemoveEntry> interfaces, may not be exposed. Thus, discovery updates may have to take place through other techniques. Also, "options" sub-element on the <RequestedServiceType> element may not be used.

In order to access a service, including the discovery service itself, the user interface device may know a substantial amount of information, which may be referred to as the resource offering. The resource offering typically contains two key pieces of data: 1) an identifier for the resource being accessed; and 2) a description of the service being accessed. An example resource offering for a service is:

```
<ResourceOffering>
  <ResourceID>urn:liberty:isf:implied-
    resource<ResourceID>
  <ServiceInstance>
    <ServiceType>urn:aol-com:services:radio</Service-
      Type>
    <ProviderID>http://radio.aol.com/</ProviderID>
    <Description>
      <SecurityMechID>
        http://ws.aol.com/security/2003-11:TLS:bearer
      </SecurityMechID>
      <Endpoint>https://radio.aol.com/</Endpoint>
    </Description>
  </ServiceInstance>
</ResourceOffering>.
```

In this example, <ResourceID> is set to "urn:liberty:isf:implied-resource," meaning that the resource being accessed is implied by other information in the message. The message also contains a security token in the header that identifies the user making the request, and, for most services, this is enough to identify the resource being accessed. In other services, (e.g., a calendar service where one user is accessing another user's calendar service), this may be used to differentiate between the requestor and the resource being accessed. <ServiceType> is the name of the service being accessed (in this case, "urn:aol-com:services:radio", indicating that this is a radio service resource offering). "Radio", however, is just an example. The actual values for this element may be defined in the service specifications for each individual service, and there may be an explicit Web Services Description Language (WSDL) definition associated with each unique service type. <ProviderID> is the unique identifier for the service provider and may be used to lookup the necessary meta-data to communicate with the provider, such as the security keys needed to authentication requests. <SecurityMechID> indicates that TLS is to be used when communicating with the service (recipient authentication) and that the messages will be authenticated using a bearer token. For a large number of basic service invocations, this mechanism may be used. <Endpoint> is the address to which the requests for this service should be submitted.

With the information provided, a user interface device will know to send messages to the <Endpoint> for the service <ServiceType> (which also defines the messages that will be accepted there) and knows the required/accepted security mechanisms at that service. If additional information is needed, the <ProviderID> may be used to lookup meta-data associated with the provider.

An API for the discovery service may be based on the Liberty Alliance configuration. However, not all services/features of the configuration have to be implemented. The following will describe one implementation of a discovery service API.

A service discovery request may be used to obtain a security token and communications information in order invoke a service. In particular implementations, the request may include a security token that authenticates the requestor and also identifies the user whose information is being accessed.

The discovery service may be located using the <ResourceOffering> that was included with the response to the initial user authentication. An example of the <Body> of a service discovery request is:

```
<Query>
  <ResourceID>urn:liberty:isf:implied-
    resource<ResourceED>
  <RequestedServiceType>
    <ServiceType>urn:aol-com:services:
      radio<ServiceType>
  <RequestedServiceType>
<Query>.
```

In this example, a radio service is being requested.

A typical response to such a request is:

```
<QueryResponse>
  <Status code="OK">
  <ResourceOffering EntryID="1">
    <ResourceID>urn:liberty:isf:implied-
      resource<ResourceID>
    <ServiceInstance>
      <ServiceType>urn:aol-com:services:
        radio<ServiceType>
      <ProviderID>http://radio.aol.com/</ProviderID>
      <Description CredentialRef="1">
        <SecurityMechID>
          http://ws.aol.com/security/2003-11:TLS:bearer
        </SecurityMechID>
        <Endpoint>https://radio.aol.com/</Endpoint>
      <Description>
    </ServiceInstance>
  </ResourceOffering>
  <Credentials>
    <lib:Assertion AssertionID="1">
      Assertion data
    <lib:Assertion>
  </Credentials>
</QueryResponse>.
```

In this example, the <Description> element has a "CredentialRef" attribute, which refers to the credential included in the response that should be used by the device when communicating with this service. This example, of course, has only one service being requested. If multiple services were requested, there may be multiple <ResourceOffering> elements followed by a <Credential> element.

After discovering services, a user interface device may perform service invocation. Service invocation involves taking the information returned from the discovery service and using the information to invoke the requested service.

The following discusses the structure for making a service invocation request, but not the details involved with each service provider. The details for a particular service provider may be found in the service specification for the service provider. These specifications may also define the actual APIs that are exposed by the service provider. The framework under discussion, however, may provide a structure for calling a wide variety, if not most, service providers.

As described earlier, the process for invoking a service generally involves authenticating a user, locating a service provider, and obtaining security credentials to be used to access the service. The following is an example of a service discovery response:

```
<QueryResponse>
  <Status code="OK">
  <ResourceOffering EntryID="1">
    <ResourceID>urn:liberty:isf:implied-resource<ResourceID>
    <ServiceInstance>
      <ServiceType>urn:aol-com:services:radio</ServiceType>
      <ProviderID>http://radio.aol.com/</ProviderID>
      <Description CredentialRef="1">
        <SecurityMechID>
          http://ws.aol.com/security/2003-11:TLS:bearer
        </SecurityMechID>
        <Endpoint>https://radio.aol.com/</Endpoint>
      </Description>
    </ServiceInstance>
  </ResourceOffering>
  <Credentials>
    <lib:Assertion ID="1" MajorVersion="1" MinorVersion="2"
      AssertionID="e06e5a28-bc80-4ba6-9ecb-712949db686e"
      Issuer="http://idp.aol.com"
      IssueInstant="2003-09-29T09:30:47Z"
      InResponseTo="4e7c3772-4fa4-4a0f-99e8-7d719ff6067c">
      <saml:Conditions NotOnOrAfter="2003-09-30T09:30:47Z" >
        <saml:AudienceRestrictionCondition>
          <saml:Audience>http://radio.aol.com</saml:Audience>
        </saml:AudienceRestrictionCondition>
      </saml:Conditions>
      <lib:AuthenticationStatement
        AuthenticationInstant="2003-09-29T09:30:20Z"
        SessionIndex="1" >
        <lib:AuthnContext>
          <lib:AuthnContextClassRef>
            http://www.projectliberty.org/.../
            PasswordProtectedTransport
          </lib:AuthnContextClassRef>
        </lib:AuthnContext>
        <lib:Subject>
          <saml:NameIdentifier>
            <lib:NameQualifier>http://aol.com</NameQualifier>
            <lib:Format>urn:liberty:iff:nameid:federated</Format>
            AOLScreenname
          </saml:NameIdentifier>
        </lib:Subject>
      </lib:AuthenticationStatement>
      <ds:Signature>
        Signature data goes here
      </ds:Signature>
    </lib:Assertion>
  </Credentials>
</QueryResponse>.
```

Based on this response, a radio service request could be submitted to the entry point "https://radio.aol.com." The credential pointed to by the "CredentialRef" attribute would be included in the <wsse: Security> header for the message.

An example of such a request would be:

```
<?xml version="1.0" encoding="utf-8" ?>
<S:Envelope
  xmlns:S="http://schemas.xmlsoap.org/soap/envelope/"
  xmlns:aol="http://schemas.aol.com/soap/devices-1.0"
  xmlns:sb="urn:liberty:wsf:soap-bind:1.0"
  xmlns:disco="urn:liberty:disco:2003-08"
  xmlns:ds="http://www.w3.org/2000/09/xmldsig#"
  xmlns:wsse="http://schemas.xmlsoap.org/ws/2002/06/secext">
  <S:Header>
    <sb:Correlation S:mustUnderstand="1"
      messageID="uuid:00123-ad32-23-09923-88239"
```

-continued

```
    timestamp="2003-06-06T12:10:10Z" />
  <aol:DeviceType name="DMA Device" man="AOL"
    version="1.0" />
  <wsse:Security>
    <lib:Assertion ID="1" MajorVersion="1" MinorVersion="2"
      AssertionID="e06e5a28-bc80-4ba6-9ecb-712949db686e"
      Issuer="http://idp.aol.com"
      IssueInstant="2003-09-29T09:30:47Z"
      InResponseTo="4e7c3772-4fa4-4a0f-99e8-7d719ff6067c">
      <saml:Conditions NotOnOrAfter="2003-09-30T09:30:47Z" >
        <saml:AudienceRestrictionCondition>
          <saml:Audience>http://radio.aol.com</saml:Audience>
        </saml:AudienceRestrictionCondition>
      </saml:Conditions>
      <lib:AuthenticationStatement
        AuthenticationInstant="2003-09-29T09:30:20Z"
        SessionIndex="1" >
        <lib:AuthnContext>
          <lib:AuthnContextClassRef>
            http://www.projectliberty.org/.../
            PasswordProtectedTransport
          </lib:AuthnContextClassRef>
        </lib:AuthnContext>
        <lib:Subject>
          <saml:NameIdentifier>
            <lib:NameQualifier>http://aol.com</NameQualifier>
            <lib:Format>urn:liberty:iff:nameid:federated</Format>
            AOLScreenname
          </saml:NameIdentifier>
          <saml:SubjectConfirmation>
            <saml:ConfirmationMethod>
              urn:oasis:names:tc:SAML:1.0:cm:Bearer
            </saml:ConfirmationMethod>
          </saml:SubjectConfirmation>
        </lib:Subject>
      </lib:AuthenticationStatement>
      <ds:Signature>
        Signature data goes here
      </ds:Signature>
    </lib:Assertion>
  </wsse:Security>
</S:Header>
<S:Body>
  Request Messages go here
</S:Body>
</S:Envelope>.
```

Note the inclusion of the assertion returned from the discovery request in the radio service invocation.

Figure 3:
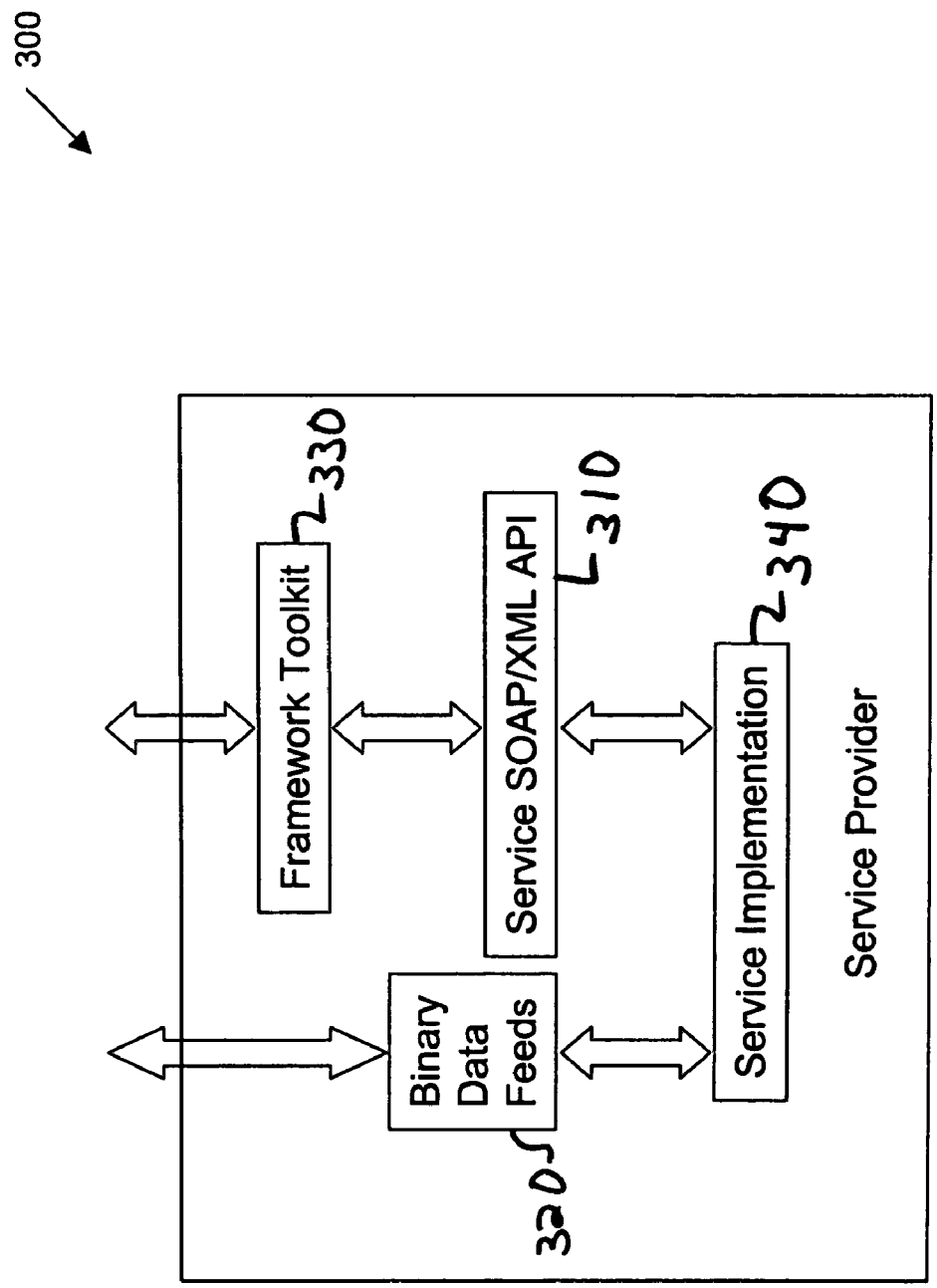
FIG. 3 is a block diagram illustrating an example service provider for digital data services.

FIG. 3 is a block diagram illustrating one example of a service provider 300. Service provider 300 may be similar to service provider 140 in FIG. 1.

The basic structure of service provider 300 allows it to expose two interfaces: 1) a SOAP/XML command and control API interface 310 that is built upon the framework API described previously; and 2) zero or more binary data feeds 320 that are appropriate to the service being delivered to the user interface device. Binary data feeds 320 may, for example, be an HTTP interface for moving photograph files to/from the service or an Ultravox protocol for streaming audio/video to a client. Whatever is appropriate to the service being provisioned may be used, and some services will likely support multiple binary feed types, depending upon the range of clients that they are trying to support. Note, however, that not all services will have the second interface, especially those that are pure text data interfaces, such as an address book or a registration service. In such cases, the data access may also be based upon the framework API.

Service provider 300 also includes a framework toolkit 330, which sits in front of SOAP/XML API interface 310. Essentially, framework toolkit 330 is a service-independent toolkit that is standardized across service providers to process the incoming requests of the framework layer so that the service provider does not need to concern itself with the framework operations for messaging (e.g., decoding, parsing, and validating the header information and the structural information in the header). Thus, framework toolkit 330 may parse the incoming messages, validate the security information, establish and maintain session context information, and pass, to API interface 310, the payload contained within the body of the message, along with key information obtained from the SOAP envelope (such as the user identity, parental control settings, etc.). In certain implementations, API interface 310 may examine and process the data contained within the SOAP envelope. Framework toolkit 330 is also responsible for wrapping the response messages as appropriate for the protocol, including adding the correlation header and session context information.

In cases where a service may rely on other services (such as a radio service calling a billing service to authorize a charge for a shipment), the framework toolkit may also provide the device-side interfaces for such a request, allowing service provider 300 to invoke other services (including the discovery service lookup and service invocation). The tool kit may hide much of the message structure from service implementation 340.

Figure 4A:
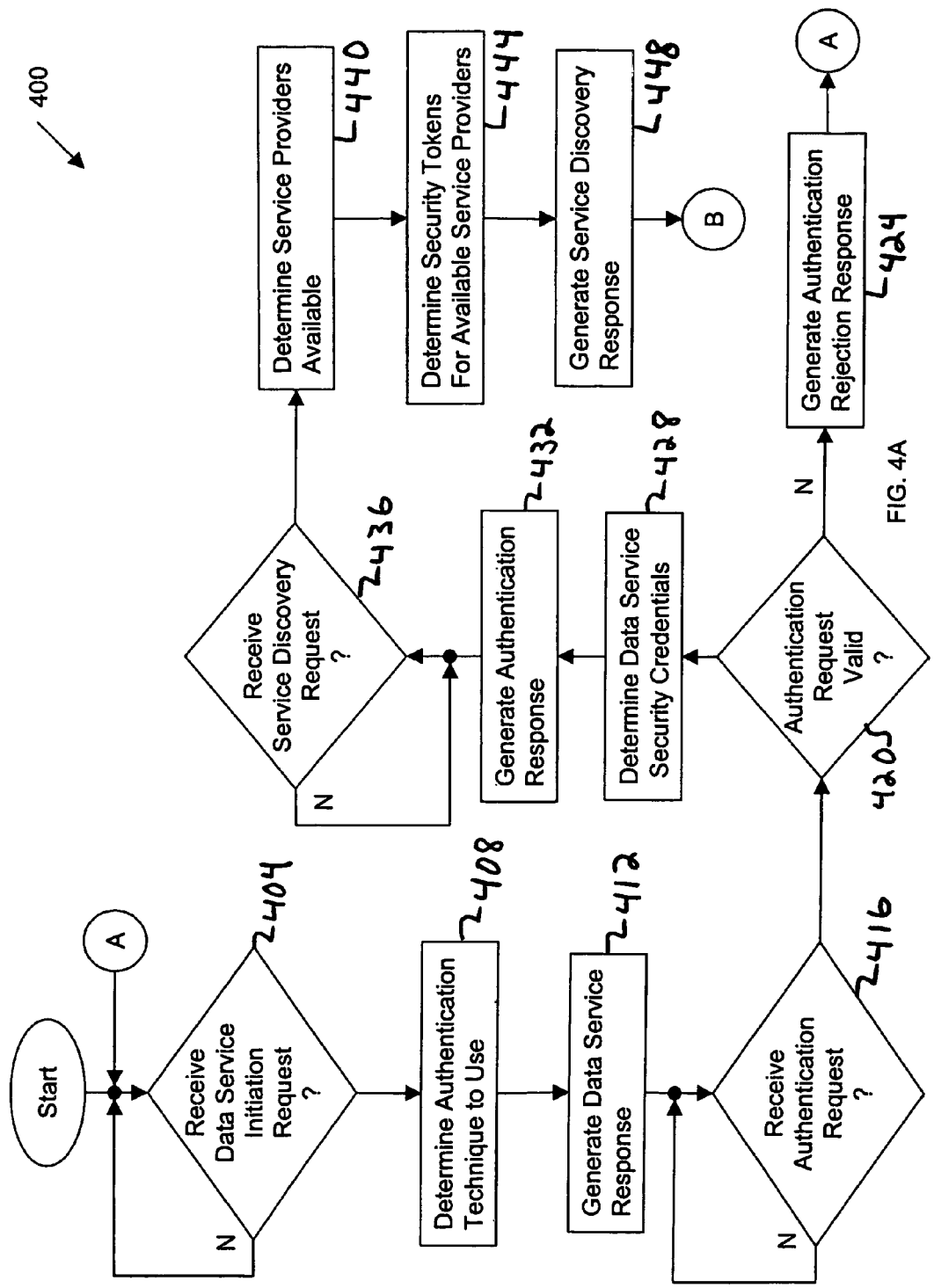
FIGS. 4A-B are a flowchart illustrating an example process for providing digital data services.
Figure 4B:
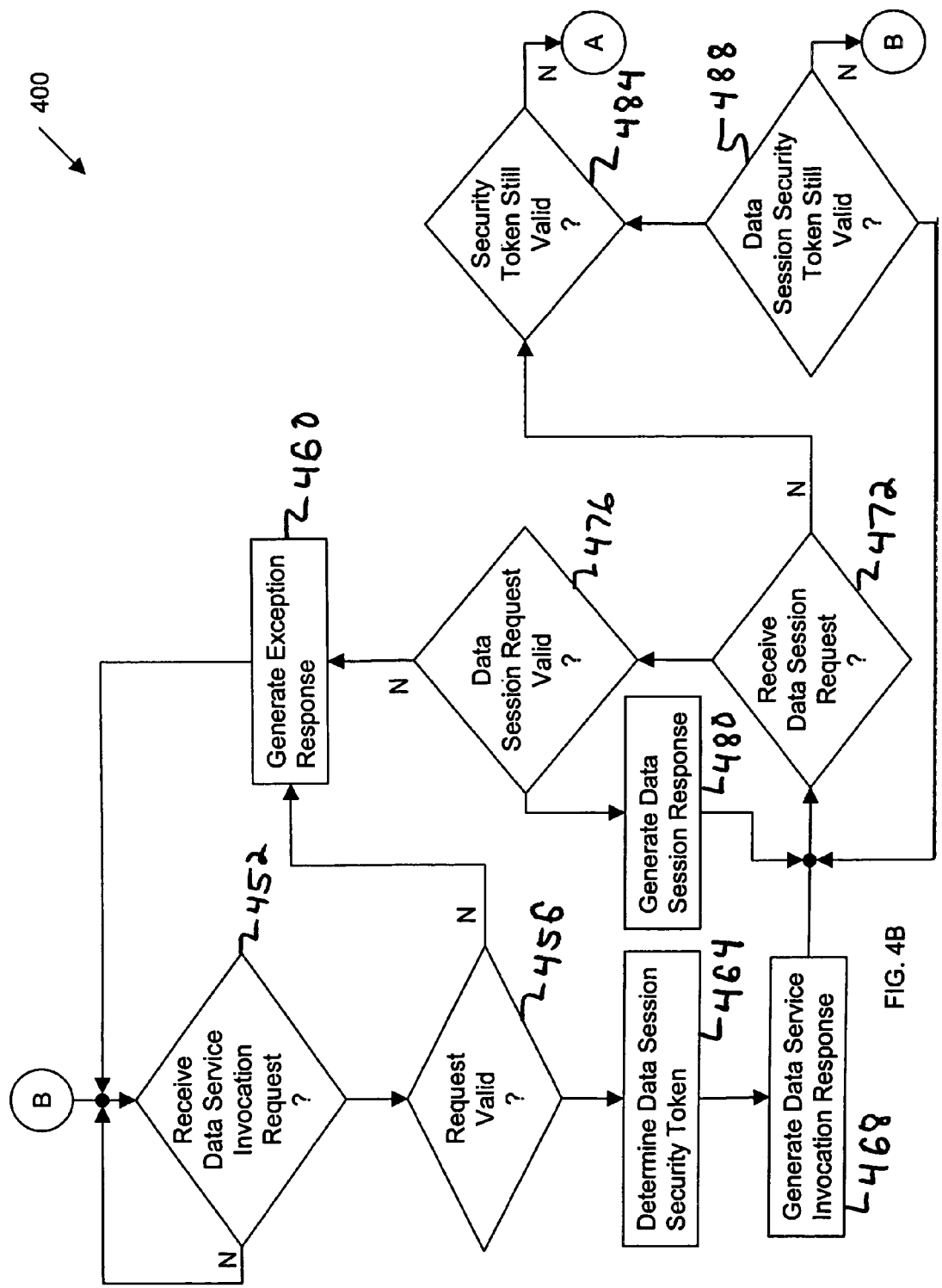

FIGS. 4A-B illustrate a process 400 for digital data services. Process 400 may characterize the operations of service infrastructure 130 and service provider 140 in FIG. 1.

Process 400 begins with waiting to receive an initiation request for digital data service from a user interface device (operation 404). The user interface device may, for example, be a consumer electronic device, and the request be expressed in a self-describing protocol.

Upon receiving the request, the process for calls for determining the authentication technique to use (operation 408). Example authentication techniques include CRAM-MD5, SECURID, and PLAIN. Determining the authentication technique to use may include examining the capabilities and/or preferences of the requesting user interface device. The process continues with generating a data service response (operation 412), which specifies the authentication technique.

Process 400 calls for waiting to receive an authentication request from the user interface device (operation 416), the authentication request including the security credentials for the user interface device/user. Upon receiving an authentication request, the process calls for determining whether the authentication request is valid (operation 420). Determining whether the request is valid may include determining whether the requesting user interface device and/or user is valid. A user interface device and user may have been previously associated so that validating either one may validate the other. If the authentication request is not valid, the process calls for generating an authentication rejection response (operation 424) and checking for another data service initiation request (operation 404).

If, however, the authentication request is valid, the process calls for determining discovery service security credentials (operation 428) and generating an authentication response (operation 432), which includes the discovery service security credentials.

The process waits to receive a service discovery request (operation 436). Upon receiving such a request, the process calls for determining which, if any, service providers are available (operation 440). A service provider may be available if it has the data service to satisfy the request and the current capacity to do so. The process also calls for determining security tokens for the available service providers (operation 444). The process then calls for generating a service discovery response (operation 448), which includes information regarding the available service providers and their associated security tokens.

The process continues with waiting to receive a data service invocation request (operation 452). The data service invocation request may be received at a service provider that is remote from the system hosting an authentication service and a discovery service and includes at least one of the security tokens determined earlier. Upon receiving a data service invocation request, the process calls for determining whether the request is valid (operation 456). Determining whether the request is valid includes evaluating the security token for the service provider. If the request is not valid, the process calls for generating an exception response (operation 460) and checking for another data service invocation request (operation 452).

If, however, the data service invocation request is valid, the process calls for determining a data session security token (operation 464). Determining the token may include retrieving a pre-existing security token or generating a new security token. The process then calls for generating a data service invocation response (operation 468), which includes the data session security token.

The process continues with determining whether a data session request has been received (operation 472), a valid data session request including the data session security token. If a data session request has been received, the process calls for determining whether the data session request is valid (operation 476). If the data session request is not valid, the process calls for generating an exception response (operation 460) and returning to check for another data service invocation request (operation 452). If, however, the data session request is valid, the process calls for generating an appropriate data session response (operation 480) and checking for another data session request (operation 472).

If a data session request has not been received, process 400 calls for determining whether the data service security token is still valid (operation 484). The token may not be valid, for example, if a predefined period of time has expired. If the security token is not still valid, the process calls for checking for a data service initiation request (operation 404).

If, however, the security token is still valid, the process calls for determining whether the data session security token is still valid (operation 488). The token may not be valid, for example, if a predefined period of time has expired. If the data session security token is not still valid, the process calls for checking for a data service invocation request (operation 452). But if the data session security token is still valid, the process calls for checking for a data session request (operation 472).

Although FIG. 4 illustrates one process for digital data services, other processes may include fewer, additional, and/or a different arrangement of operations. For example, the authentication information could be sent in the initial data service request, especially if the user interface device only has one way to authenticate. As another example, the data session security token could be changed on a regular or irregular basis. For instance, the token could be changed after every data session request. As an additional example, a request may be received to update (e.g., renew) a data session security token. If the request is valid, the data session security token may be updated.

Figure 5:
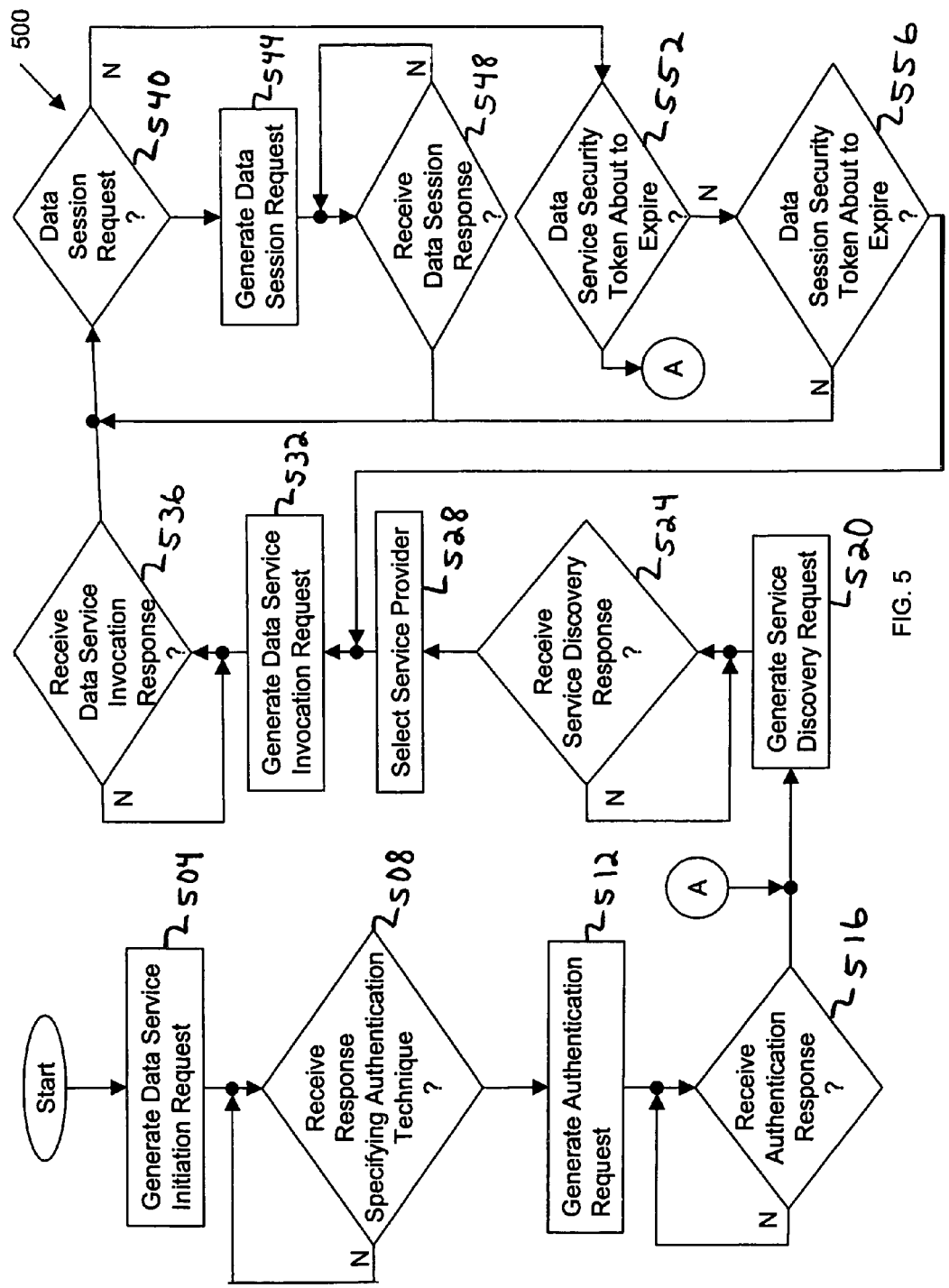
FIG. 5 is a flowchart illustrating an example process for providing digital data services.

FIG. 5 illustrates an example process 500 for providing digital data services. Process 500 may represent the operations of user interface device 110 in FIG. 1.

Process 500 begins with generating an initiation request for digital data service (operation 504). The request may, for example, be generated at a consumer electronic device and be expressed in a self-describing protocol.

The process continues with waiting to receive a response that specifies an authentication technique (operation 508). Upon receiving such a response, the process calls for generating an authentication request (operation 512). The authentication request may include security credentials for validating a user and/or user interface device. The process then calls for waiting to receive an authentication response (operation 516), which includes a security token for a discovery service.

Upon receiving the authentication response, process 500 calls for generating a service discovery request (operation 520). The service discovery request is directed to a discovery service and includes the security token from the authentication response. The process then calls for waiting for a service discovery response (operation 524). The service discovery response includes information regarding the available service providers and their associated security tokens.

The process continues with selecting a service provider (operation 528) and generating a data service invocation request (operation 532). The data service invocation request includes the earlier received security token for the service provider. The process then calls for waiting to receive a data service invocation response (operation 536). The data service invocation response includes a second security token, to be used during the data session in place of the security token for the data service. The second security token may be substantially smaller than the security token for the data service, allowing for more ready processing.

Process 500 continues with determining whether a data session request should be sent (operation 540). A data session request may be sent, for example, to initiate a data feed or to modify a data feed. If a data session request should be sent, the process calls for generating a data session request (operation 544). The data session request includes the data session security token received previously. The process then calls for waiting to receive a data session response (operation 548) and returning to check whether another data session request should be sent (operation 540).

If a data session request should not be sent, the process calls for determining whether the data service security token is about to expire (operation 552). If the data service security token is about to expire, the process calls for generating another service discovery request (operation 520), this one to update the token.

If, however, the data service security token is not about to expire, the process calls for determining whether the data session security token is about to expire (operation 556). If the data service security token is about to expire, the process calls for generating another data service invocation request (operation 532), this one to update the token. But if the data session security token is not about to expire, the process calls for checking whether a data session request should be sent (operation 540).

Although FIG. 5 illustrates one process for digital data services, other processes may include fewer, additional, and/or a different arrangement of operations. For example, the authentication information could be sent in the initial data service request, especially if a user interface device only has one way to authenticate. As another example, the data session security token could change on a regular or irregular basis. For instance, a new token may arrive in every data session response. As an additional example, receiving an exception or not renewing a security token before it expires may lead to generating a data service initiation request.

Several systems and techniques for providing data service to a client have been discussed to this point. It should be recognized, however, that other types of service providers and/or clients may also use the discussed techniques. For example, a content-management service provider, which may provide services such as contact and calendar management, may use the techniques in being updated with new information from a client. As another example, an action-initiating service provider, which may provide services such as environmental controls (e.g., lighting adjustments), location services, or messaging (e.g., instant messaging), may use the techniques in receiving multiple requests from a client. (The service provider may return responses that indicate the beginning, intermediate state, and/or completion of the requested service.) Thus, a service provider may provide any type of computer-related service to and/or for a client. As a further example, a service provider and/or a client may be a computer program (e.g., software) executing on a computer (e.g., a personal computer, a server, or a workstation).

The following illustrates another example of invoking a data service, by providing examples of messages for invoking a data service. In particular, the user interface device in this example is a digital media adaptor that presents a user with both radio and photo services in an entertainment center. Also, a SOAP message, including headers, is used for each operation. Note, however, that the illustrated security tokens passed will not be verifiable, because the signatures are fake since these are only example messages, and the operations performed here are but one example of performing the tasks. There also may be several other ways to accomplish the same task that might be more appropriate in different circumstances.

In this example, the user interface device has previously been associated with a user account, so the user does not need to perform any authentication/registration process. When the user turns on the device, the device brings up the main screen for the user. There may be several areas on this screen that require user-specific content (such as a "now playing" area for radio, or a "what's new" area for data in their photo service).

The user interface device then initiates device authentication with an authentication service. This request may be submitted to "https://auth.ws.aol.com" (a bootstrap entry point for the authentication service). An example of the request appears below:

```
<?xml version="1.0" encoding="utf-8" ?>
<S:Envelope
    xmlns:S="http://schemas.xmlsoap.org/soap/envelope/"
    xmlns:aol="http://schemas.aol.com/"
    xmlns:sb="urn:liberty:wsf:soap-bind:1.0"
    xmlns:sa="urn:liberty:wsf:soap-auth:1.0">
    <S:Header>
        <sb:Correlation S:mustUnderstand="1"
            messageID="uuid:0023923-28329023-238239023"
            timestamp="2003-06-06T12:10:10Z"/>
    </S:Header>
    <S:Body>
        <aol:AuthRequest     devUPC="123456789012"
            devSN="10023923">
            <sa:SASLRequest mechanisms="CRAM-MD5">
        </aol:AuthRequest>
    </S:Body>
</S:Envelope>.
```

The authentication service then responds with its authentication mechanism choice. In this instance, the authentication service decides to use CRAM-MD5 as the authentication method and provides the challenge data:

```
<?xml version="1.0" encoding="utf-8" ?>
<5:Envelope
    xmlns:S="http://schemas.xmlsoap.org/soap/envelope/"
    xmlns:aol="http://schemas.aol.com/"
    xmlns:sb="urn:liberty:wsf:soap-bind:1.0"
    xmlns:sa="urn:liberty:wsf:soap-auth:1.0">
    <S:Header>
        <sb:Correlation S:mustUnderstand="1"
            messagID="uuid:00287-83782-238891-09981"
            refToMessageID="uuid:0023923-28329023-
                238239023"
            timestamp="2003-06-06T12:10:10Z"/>
    </S:Header>
    <S:Body>
        <aol:AuthResponse>
            <sa:SASLResponse mechanisms="CRAM-MD5">
                <Status code="continue"/>
                1896.697170952@postoffice.example.net
            </sa:SASLResponse>
        </aol:AuthResponse>
    </S:Body>
</S:Envelope>.
```

Notes that the "refToMessaggeID" field is set to the message ID in the authentication request from the user interface device, and the value inside of <SASLResponse> is the CRAM-MD5 challenge value for the client.

The user interface device then prepares and submits its credentials to the authentication service. In this example, the device prepares the MD5 digest using the provided challenge as well as the shared secret (in this case "tanstaaftanstaaf") and sends a response to the authentication service:

```
<?xml version="1.0" encoding="utf-8" ?>
<S:Envelope>
    xmlns:S="http://schemas.xmlsoap.org/soap/envelope/"
    xmlns:aol="http://schemas.aol.com/"
    xmlns:sb="urn:liberty:wsf:soap-bind:1.0"
    xmlns:sa="urn:liberty:wsf:soap-auth:1.0">
    <S:Header>
        <sb:Correlation S:mustUnderstand="1"
            messageID="uuid:0023923-28329023-238239026"
            refToMessageID="uuid:00287-83782-238891-
                09981"
            timestamp="2003-06-06T12:10:11Z"/>
    </S:Header>
    <S:Body>
        <aol:AuthRequest     devUPC="123456789012"
            devSN="10023923">
            <sa:SASLRequest mechanisms="CRAM-MD5">
                dGltIGI5MTNhNjAyYzdlZGE3YTQ5NWIOZTZ1NzMz
                NGQzODkw
            </sa:SASLRequest>
        </aol:AuthRequest>
    </S:Body>
</S:Envelope>.
```

Note that even though devUPC and devSN were included in the original request, they were included in this request mostly for clarity, since the service correlates the authentication request with a previous response to correlate the response to the challenge data. The refToMessageID ties this request to the previous response so that the authentication service may correlate this message to the challenge it sent in the previous message.

The authentication service processes the authentication request and returns the security token for the discovery service to the user interface device along with the bootstrap information for accessing the discovery service:

```
<?xml version="1.0" encoding="utf-8" ?>
<S:Envelope>
    xmlns:S="http://schemas.xmlsoap.org/soap/envelope/"
    xmlns:aol="http://schemas.aol.com/"
    mlns:disco="urn:liberty:disco:2003-08"
```

```
xmlns:ds="http://www.w3.org/2000/09/xmldsig#"
xmlns:sb="urn:liberty:wsfisoap-bind:1.0"
xmlns:sa="urn:liberty:wsf:soap-auth:1.0">
<S:Header>
    <sb:Correlation S:mustUnderstand="1"
    messaggeID="uuid:00287-23928392-193482390"
    refToMessageID="uuid:0023923-28329023-
        238239026"
    timestamp="2003-06-06T12:10:11Z"/>
</S:Header>
<S:Body>
    <aol:AuthResponse>
        <sa:SASLResponse>
        <sa:Status code="success"/>
        <sa:Credential>
            <lib:Assertion    MajorVersion="1"    MinorVer-
                sion="2"
            AssertionID="e06e5a28-bc80-4ba6-9ecb-712949
                db686e"
            Issuer="http://idp.aol.com"
            IssueInstant="2003-06-06T12:10:11Z"
            InResponseTo="uuid:0023923-28329023-
                238239026">
                <saml:Conditions    NotOnOrAfter="2003-06-
                    07T12:10:10Z">
                    <saml:AudienceRestrictionCondition>
                        <saml:Audience>http://discovery.aol.com</
                        saml:Audience>
                    </saml:AudienceRestrictionCondition>
                </saml:Conditions>
                <lib:AuthenticationStatement
                    AuthenticationInstant="2003-06-06T12:10:
                    11Z"
                    SessionIndex="1">
                <lib:AuthnContext>
                <lib:AuthnContextClassRef>
                    http://schemas.aol.com/authctx/classes/
                    DeviceProtectedTransport
                </lib:AuthnContextClassRef>
            </lib:AuthnContext>
            <lib:Subject>
                <saml:NameIdentifier>
                <lib:NameQualifier>http://aol.com</NameQuali-
                    fier>
                <lib:Format>urn:liberty:iff:nameid:
                    federated<Format>
                    AOLScreenname
                </saml:NameIdentifier>
                <saml:SubjectConfirmation>
                <saml:ConfirmationMethod>
                urn:oasis:names:tc:SAML:1.0:cm:Bearer
                </saml:ConfirmationMethod>
            </saml:SubjectConfirmation>
        </lib:Subject>
    </lib:AuthenticationStatement>
    <saml:AttributeStatement>
        <lib:Subject>
            <saml:NameIdentifier>
            <lib:NameQualifier>http://
                aol.com<NameQualifier>
            <lib:Format>urn:liberty:iff:nameid:
                federated<Format>
                AOLScreenname
            </saml:NameIdentifier>
        </lib:Subject>
        <saml:Attribute AttributeName="devUPC"
            AttributeNamespace="http://schemas.aol.com">
        <saml:AttributeValue>123456789012
        </saml:AttributeValue>
        <saml:Attribute>
</saml:AttributeStatement>
<ds:Signature>
    Signature data goes here
</ds:Signature>
</lib:Assertion>
    <sa:Credential>
    <disco:ResourceOffering>
    <disco:ResourceED>urn:liberty:isf:implied-
        resource<disco:ResourceID>
    <disco:ServiceInstance>
    <disco:ServiceType>urn:liberty:disco:2003-
        08<disco:ServiceType>
    <disco:ProviderID>http://discovery.aol.com
    <disco:ProviderID>
    <disco:Description    CredentialRef="e06e5a28-
        bc80-4ba6-9ecb-712949 db686e">
    <disco:SecurityMechID> . . . <disco:Security-
        MechID>
    <disco:Endpoint>https://discovery.ws.aol.com
    </disco:EndPoint>
    <disco:Description>
    <disco:ServiceInstance>
    </disco:ResourceOffering>
</sa:SASLResponse>
    </aol:AuthResponse>
</S:Body>
</S:Envelope>.
```

There are two key pieces of information in this message—the discovery service resource offering and the authentication assertion to be used at that service.

The user interface device then requests service information from the discovery service, at the entry point returned in the previous message (i.e., "https://discovery.ws.aol.com"). This address could change on a user-by-use and/or call-by-call basis, so the user interface device should retrieve the correct value for information about the radio service from the message returned during the authentication process. An example of the discovery service request is:

```
<?xml version="1.0" encoding="utf-8" ?>
<S:Envelope>
    xmlns:S="http://schemas.xmlsoap.org/soap/envelope/"
    xmlns:aol="http://schemas.aol.com/"
    xmlns:disco="urn:liberty:disco:2003-08"
    xmlns:ds="http://www.w3.org/2000/09/xmldsig#"
    xmlns:sb="urn:liberty:wsf:soap-bind:1.0"
    xmlns:sa="urn:liberty:wsf:soap-auth:1.0">
    <S:Header>
        <sb:Correlation S:mustUnderstand="1"
        messageID="uuid:0023923-28329328-23789404578"
        timestamp="2003-06-06T12:10:12Z" />
        <wsse:Security>
            <lib:Assertion MajorVersion="1" MinorVersion="2"
            AssertionID="e06e5a28-bc80-4ba6-9ecb-712949db686e"
            Issuer="http://idp.aol.com"
            IssueInstant="2003-06-06T12:10:11Z"
            InResponseTo="uuid:0023923-28329023-238239026">
                <saml:Conditions NotOnOrAfter="2003-06-07T12:10:10Z">
                    <saml:AudienceRestrictionCondition>
                        <saml:Audience>http://discovery.aol.com</saml:Audience>
                    </saml:AudienceRestrictionCondition>
                </saml:Conditions>
                <lib:AuthenticationStatement
                    AuthenticationInstant="2003-06-06:12:10:11Z"
                    SessionIndex="1">
                <lib:AuthnContext>
                    <lib:AuthnContextClassRef>
                        http://schemas.aol.com/authctx/classes/
                        DeviceProtectedTransport
                    </lib:AuthnContextClassRef>
```

```
                </lib:AuthnContext>
                <lib:Subject>
                    <saml:NameIdentifier>
                        <lib:NameQualifier>http://aol.com</NameQualifier>
                        <lib:Format>urn:liberty:iff:nameid:federated
                        </Format>
                        AOLScreenname
                    </saml:NameIdentifier>
                    <saml:SubjectConfirmation>
                        <saml:ConfirmationMethod>
                            urn:oasis:names:tc:SAML:1.0:cm:Bearer
                        </saml:ConfirmationMethod>
                    </saml:SubjectConfirmation>
                </lib:Subject>
            </lib:AuthenticationStatement>
            <saml:AttributeStatement>
                <lib:Subject>
                    <saml:NameIdentifier>
                        <lib:NameQualifier>http://aol.com</NameQualifier>
                        <lib:Format>urn:liberty:iff:nameid:federated
                        /Format>
                        AOLScreenname
                    </saml:NameIdentifier>
                </lib:Subject>
                <saml:Attribute AttributeName="devUPC"
                    AttributeNamespace="http://schemas.aol.com">
                    <saml:AttributeValue>123456789012
                    </saml:AttributeValue>
                </saml:Attribute>
            </saml:AttributeStatement>
            <ds:Signature>
                Signature data goes here
            </ds:Signature>
        </lib:Assertion>
    </wsse:Security>
</S:Header>
<S:Body>
    <disco:Query>
        <ResourceID> urn:liberty:isf:implied-resource</ResourceID>
        <RequestedServiceType>
            <ServiceType>urn:aol-com:services:radio</ServiceType>
        </RequestedServiceType>
    </disco:Query>
</S:Body>
</S:Envelope>.
```

This message includes the assertion returned from the authentication process in the <ws:Security> header in the message. There is, however, no "refToMessageID" in the <Correlation> header, because this message is the first message in the communication sequence with the discovery service.

The discovery service then processes the request and responds to the user interface device with the radio service resource offering, the necessary credentials for the radio service, and a session context for subsequent calls to the discovery service:

```
<?xml version="1.0" encoding="utf-8" ?>
<S:Envelope>
    xmlns:S="http://schemas.xmlsoap.org/soap/envelope/"
    xmlns:aol="http://schemas.aol.com/"
    xmlns:disco="urn:liberty:disco:2003-08"
    xmlns:ds="http://www.w3.org/2000/09/xmldsig#"
    xmlns:sb="urn:liberty:wsf:soap-bind:1.0">
    <S:Header>
        <sb:Correlation S:mustUnderstand="1"
            messaggeID="uuid:00287-23234564-098098798"
            refToMessageID="uuid:0023923-28329328-23789404578"
            timestamp="2003-06-06T12:10:12Z" />
        <aol:ServiceSessionContext>
            023893207akf;lkqwrtp8ywea:aasfqw;4uq4tqe4twhrwe5
            tywrwerthsadfiy3096driuqw360p7341uyerg734634
            tlarh02375uert396485twertertlq4tr9p275qwer
            239qqw=349y84ter
        </aol:ServiceSessionContext>
    </S:Header>
</S:Body>
<disco:QueryResponse>
    <Status code="OK"/>
    <disco:ResourceOffering EntryID="1">
        <disco:ResourceID>urn:liberty:isf:implied-
            resource<disco:ResourceID>
        <disco:ServiceInstance>
            <disco:ServiceType>urn:aol-com:services:
                radio</disco:ServiceType>
            <disco:ProviderID>http://radio.ws.aol.com/
            </disco:ProviderID>
            <disco:Description CredentialRef="9f3d54a0-4899-
                8a3d-9328-328ad3e4ef90">
                <SecurityMechID>
                    http://ws.aol.com/security/2003-11:TLS:bearer
                </SecurityMechID>
                <Endpoint>https://radio.ws.aol.com/</Endpoint>
            </disco:Description>
        </disco:ServiceInstance>
    </disco:ResourceOffering>
    <disco:Credentials>
        <lib:Assertion MajorVersion="1" MinorVersion="2"
            AssertionID="9f3d54a0-4899-8a3d-9328-328ad3e4ef90"
            Issuer="http://idp.aol.com"
            IssueInstant="2003-06-06T12:10:11Z"
            InResponseTo="uuid:0023923-28329023-238239026">
            <saml:Conditions NotOnOrAfter="2003-06-07T12:10:10Z">
                <saml:AudienceRestrictionCondition>
                    <saml:Audience>http://radio.ws.aol.com
                    </saml:Audience>
                </saml:AudienceRestrictionCondition>
            </saml:Conditions>
            <lib:AuthenticationStatement
                AuthenticationInstant="2003-06-06:12:10:11Z"
                SessionIndex="1">
                <lib:AuthnContext>
                    <lib:AuthnContextClassRef>
                        http://schemas.aol.com/authctx/classes/
                        DeviceProtectedTransport
                    </lib:AuthnContextClassRef>
                </lib:AuthnContext>
                <lib:Subject>
                    <saml:NameIdentifier>
                        <lib:NameQualifier>http://aol.com
                        </NameQualifier>
                        <lib:Format>urn:liberty:iff:nameid:federated
                        </Format>
                        AOLScreenname
                    </saml:NameIdentifier>
                    <saml:SubjectConfirmation>
                        <saml:ConfirmationMethod>
                            urn:oasis:names:tc:SAML:1.0:cm:Bearer
                        </saml:ConfirmationMethod>
                    </saml:SubjectConfirmation>
                </lib:Subject>
            </lib:AuthenticationStatement>
            <saml:AttributeStatement>
                <lib:Subject>
                    <saml:NameIdentifier>
                        <lib:NameQualifier>http://aol.com
                        </NameQualifier>
                        <lib:Format>urn:liberty:iff:nameid:federated
                        </Format>
                        AOLScreenname
                    </saml:NameIdentifier>
                </lib:Subject>
                <saml:Attribute AttributeName="devUPC"
                    AttributeNamespace="http://schemas.aol.com">
                    <saml:AttributeValue>123456789012
                    </saml:AttributeValue>
                </saml:Attribute>
            </saml:AttributeStatement>
            <ds:Signature>
                Signature data goes here
            </ds:Signature>
        </lib:Assertion>
    </disco:Credentials>
</disco:QueryResponse>
```

```
        </S:Body>
</S:Envelope>.
```

The user interface device then requests data from the radio service. The device, having the contact information and credentials for the radio service, submits a service request to the server hosting the radio service (i.e., to the endpoint identified in the resource offering: "https://radio.ws.aol.com"). An example of such a service request is:

```
<?xml version="1.0" encoding="utf-8" ?>
<S:Envelope>
   xmlns:S="http://schemas.xmlsoap.org/soap/envelope/"
   xmlns:aol="http://schemas.aol.com/"
   xmlns:disco="urn:liberty:disco:2003-08"
   xmlns:ds="http://www.w3.org/2000/09/xmldsig#"
   xmlns:sb="urn:liberty:wsf:soap-bind:1.0">
   <S:Header>
      <sb:Correlation S:mustUnderstand="1"
         messageID="uuid:9897923-82398723-092739723"
         timestamp="2003-06-06T12:10:16Z" />
      <wsse:Security>
         <lib:Assertion MajorVersion="1" MinorVersion="2"
            AssertionID="9f3d54a0-4899-8a3d-9328-328ad3e4ef90"
            Issuer="http://idp.aol.com"
            IssueInstant="2003-06-06T12:10:11Z"
            InResponseTo="uuid:0023923-28329023-238239026">
            <saml:Conditions NotOnOrAfter="2003-06-07T12:10:10Z">
               <saml:AudienceRestrictionCondition>
                  <saml:Audience>http://radio.ws.aol.com
                  </saml:Audience>
               </saml:AudienceRestrictionCondition>
            </saml:Conditions>
            <lib:AuthenticationStatement
               AuthenticationInstant="2003-06-06:12:10:11Z"
               SessionIndex="1" >
               <lib:AuthnContext>
                  <lib:AuthnContextClassRef>
                     http://schemas.aol.com/authctx/classes/
                     DeviceProtectedTransport
                  </lib:AuthnContextClassRef>
               </lib:AuthnContext>
               <lib:Subject>
                  <saml:NameIdentifier>
                     <lib:NameQualifier>http://aol.com
                     </NameQualifier>
                     <lib:Format>urn:liberty:iff:nameid:federated
                     </Format>
                     AOLScreenname
                  </saml:NameIdentifier>
                  <saml:SubjectConfirmation>
                     <saml:ConfirmationMethod>
                        urn:oasis:names:tc:SAML:1.0:cm:Bearer
                     </saml:ConfirmationMethod>
                  </saml:SubjectConfirmation>
               </lib:Subject>
            </lib:AuthenticationStatement>
            <saml:AttributeStatement>
               <lib:Subject>
                  <saml:NameIdentifier>
                     <lib:NameQualifier>http://aol.com
                     </NameQualifier>
                     <lib:Format>urn:liberty:iff:nameid:federated
                     </Format>
                     AOLScreenname
                  </saml:NameIdentifier>
               </lib:Subject>
               <saml:Attribute AttributeName="devUPC"
                  AttributeNamespace="http://schemas.aol.com">
                  <saml:AttributeValue>123456789012
                  </saml:AttributeValue>
               </saml:Attribute>
            </saml:AttributeStatement>
            <ds:Signature>
               Signature data goes here
            </ds:Signature>
         </lib:Assertion>
      </wsse:Security>
   </S:Header>
   <S:Body>
      <GetStationList/>
   </S:Body>
</S:Envelope>.
```

The authentication assertion returned with the discovery service response is included in the request to the radio service to identify the user.

The radio service processes the request and returns the list of stations to the client:

```
<?xml version="1.0" encoding="utf-8" ?>
<S:Envelope>
   xmlns:S="http://schemas.xmlsoap.org/soap/envelope/"
   xmlns:aol="http://schemas.aol.com/"
   xmlns:sb="urn:liberty:wsf:soap-bind:1.0">
   <S:Header>
      <sb:Correlation S:mustUnderstand="1"
         messaggeID="uuid:23452-7345097234-
            0974234097"
         refToMessageID="uuid:9897923-82398723-
            092739723"
         timestamp="2003-06-06T12:10:16Z"/>
      <aol:RedirectTo S:mustUnderstand="1"
         endPoint="https://Radio15.ws.aol.com/">
      <aol:ServiceSessionContext
         NotOnOrAfter="2003-06-07T12:10:10Z">
         023893207akf;lkqwrtp8ywea:aasfqw;
         4uq4tqe4twhrwe5tywrwerthsadfiy3096
         driuqw360p734luyerg734634tlarh02375uert396485twertertlq4tr9p275qwer
         239qqw=349y84ter
      </aol:ServiceSessionContext>
   </S:Header>
   <S:Body>
      // Station List data included here
   </S:Body>
<S:Envelope>.
```

As part of this response, the radio service returns a session context for the client for use on subsequent requests. In this example, the radio service instructs the client to submit subsequent requests to a new server ("https://Radio15.ws.aol.com/").

The user interface device then needs detailed station information for one of the stations returned in the previous message. This time, because of the <ServiceSessionContext> returned in the previous call, the request is submitted to "https://Radio15.ws.aol.com," and the assertion is not included in the request:

```
<?xml version="1.0" encoding="utf-8" ?>
<S:Envelope>
   xmlns:S="http://schemas.xmlsoap.org/soap/envelope/"
   xmlns:aol="http://schemas.aol.com/"
   xmlns:sb="urn:liberty:wsf:soap-bind:1.0">
   <S:Header>
      <sb:Correlation S:mustUnderstand="1"
         messaggeID="uuid:23409723497-20972347-
            23407234"
         refToMessageID="uuid:23452-7345097234-
            0974234097"
         timestamp="2003-06-06T12:10:16Z"/>
      <aol:ServiceSessionContext
         NotOnOrAfter="2003-06-07T12:10:10Z"
         endPoint="https://Radio15.ws.aol.com/">
```

023893207aktIkqwrtp8ywea:aasfqw;
4uq4tqe4twhrwe5tywrwerthsadfiy3096
driuqw360p734luyerg734634tlarh02375uert
396485twertertlq4tr9p275qwer
239qqw=349y84ter
</aol:ServiceSessionContext>
<S:Header>
<S:Body>
// Get Station Detail command
</S:Body>
</S:Envelope>.

The "refToMessageID" attribute is set to the message ID of the previous response message from the radio server.

The radio service processes the request and returns the detailed station info:

<?xml version="1.0" encoding="utf-8" ?>
<S:Envelope>
xmlns:S="http://schemas.xmlsoap.org/soap/envelope/"
xmlns:aol="http://schemas.aol.com/"
xmlns:sb="urn:liberty:wsf:soap-bind:1.0">
<S:Header>
<sb:Correlation S:mustUnderstand="1"
messaggeID="uuid:23568989-07123493294-23723"
refToMessageID="uuid:23409723497-20972347-23407234"
timestamp="2003-06-06T12:10:16Z"/>
</S:Header>
<S:Body>
// Station Details
</S:Body>
</S:Envelope>.

In this response, the radio service did not return another <ServiceSessionContext> to the user interface device. This means that the existing context is still valid and should be used on the next request.

As mentioned previously, the user interface device also may access a photo service. To accomplish this, a user may select a photo icon on the display of the user interface device, and the device will understand that it needs to contact a photo service. The device submits a discovery request to find the photo service contact information:

<?xml version="1.0" encoding="utf-8" ?>
<S:Envelope>
xmlns:S="http://schemas.xmlsoap.org/soap/envelope/"
xmlns:aol="http://schemas.aol.com/"
xmlns:disco="urn:liberty:disco:2003-08"
xmlns:ds="http://www.w3.org/2000/09/xmldsig#"
xmlns:sb="urn:liberty:wsf:soap-bind:1.0">
<S:Header>
<sb:Correlation S:mustUnderstand="1"
messageID="uuid:09213802-230987987-238797234"
refToMessageID="uuid:00287-23234564-098098798"
timestamp="2003-06-06T18:29:18Z"/>
<aol:ServiceSessionContext NotOnOrAfter="2003-06-07T12:10:10Z">
023893207aktlkqwrtp8ywea:aasfqw;
4uq4tqe4twhrwe5
tywrwerthsadfiy3096driuqw360p734luyerg734634tlarh02375uert
396485twertertlq4tr9p275qwer239qqw=349y84ter
</aol:ServiceSessionContext>
</S:Header>
<S:Body>
<disco:Query>
<disco:ResourceID>urn:liberty:isf:implied-resource
</disco:ResourceID>
<disco:RequestedServiceType>
<disco:ServiceType>urn:aol-com:services:photo
</disco:ServiceType>
</disco:RequestedServiceType>
</disco:Query>
</S:Body>
</S:Envelope>.

The request includes the session context returned earlier from the discovery service and does not include a ws-security header. Since this is essentially a continuation of the session with the discovery service, the request includes the message ID of the last response from the discovery service.

The discovery service processes the request and responds to the user interface device with the photo service resource offering, the security token(s) for the photo service, and a session context for subsequent calls to the discovery service:

<?xml version="1.0" encoding="utf-8" ?>
<S:Envelope>
xmlns:S="http://schemas.xmlsoap.org/soap/envelope/"
xmlns:aol="http://schemas.aol.com/"
xmlns:disco="urn:liberty:disco:2003-08"
xmlns:ds="http://www.w3.org/2000/09/xmldsig#"
xmlns:sb="urn:liberty:wsf:soap-bind:1.0"
xmlns:sa="urn:liberty:wsf:soap-auth:1.0">
<S:Header>
<sb:Correlation S:mustUnderstand="1"
messaggeID="uuid:33489-8972323-89798237912"
refToMessageID="uuid:09213802-230987987-238797234"
timestamp="2003-06-06T18:29:18Z" />
<aol:ServiceSessionContext>
023893207akf;lkqwrtp8ywea:aasfqw;4uq4tqe4twhrwe5
tywrwerthsadfiy3096driuqw360p734luyerg734634tlarh02375
uert396485twertertlq4tr9p275qwer239qqw=349y84ter
</aol:ServiceSessionContext>
</S:Header>
<S:Body>
<disco:QueryResponse>
<Status code="OK" />
<disco:ResourceOffering EntryID="1">
<disco:ResourceID>urn:liberty:isf:implied-
resource<disco:ResourceID>
<disco:ServiceInstance>
<disco:ServiceType>urn:aol-com:services:photo
</disco:ServiceType>
<disco:ProviderID>http://photo.ws.aol.com/
</disco:ProviderID>
<disco:Description CredentialRef="9fd3eda-b34a-9008-a334-3234dea90f5">
<SecurityMechID>
http://ws.aol.com/security/2003-11:TLS:bearer
</SecurityMechID>
<Endpoint>https://photo.ws.aol.coml</Endpoint>
<disco:Description>
</disco:ServiceInstance>
</disco:ResourceOffering>
<disco:Credentials>
<lib:Assertion MajorVersion="1" MinorVersion="2"
AssertionID="9fd3eda-b34a-9008-a334-3234dea90f5"
Issuer="http://idp.aol.com"
IssueInstant="2003-06-06T18:29:18Z"
InResponseTo="uuid:0023923-28329023-238239026">
<saml:Conditions NotOnOrAfter="2003-06-07T12:10:10Z">
<saml:AudienceRestrictionCondition>
<saml:Audience>http://photo.ws.aol.com
</saml:Audience>
</saml:AudienceRestrictionCondition>
</saml:Conditions>
<lib:AuthenticationStatement
AuthenticationInstant="2003-06-06T12:10:11Z"
SessionIndex="1">
<lib:AuthnContext>
<lib:AuthnContextClassRef>
http://schemas.aol.com/authctx/classes/

```
                DeviceProtectedTransport
            </lib:AuthnContextClassRef>
        </lib:AuthnContext>
        <lib:Subject>
            <saml:NameIdentifier>
                <lib:NameQualifier>http://aol.com
                </NameQualifier>
                <lib:Format>urn:liberty:iff:nameid:federated
                </Format>
                AOLScreenname
            </saml:NameIdentifier>
            <saml:SubjectConfirmation>
                <saml:ConfirmationMethod>
                    urn:oasis:names:tc:SAML:1.0:cm:Bearer
                </saml:ConfirmationMethod>
            </saml:SubjectConfirmation>
        </lib:Subject>
    </lib:AuthenticationStatement>
    <saml:AttributeStatement>
        <lib:Subject>
            <saml:NameIdentifier>
                <lib:NameQualifier>http://aol.com
                </NameQualifier>
                <lib:Format>urn:liberty:iff:nameid:federated
                </Format>
                AOLScreenname
            </saml:NameIdentifier>
        <lib:Subject>
        <saml:Attribute AttributeName="devUPC"
            AttributeNamespace="http://schemas.aol.com">
            <saml:AttributeValue>123456789012
            </saml:AttributeValue>
        </saml:Attribute>
    </saml:AttributeStatement>
    <ds:Signature>
        Signature data goes here
    </ds:Signature>
    </lib:Assertion>
    </disco:Credentials>
</disco:QueryResponse>
</S:Body>
</S:Envelope>.
```

The user interface device may then request information from the photo service. For example, the device may request a list of folders from the photo service using the following:

```
<?xml version="1.0" encoding="utf-8" ?>
<S:Envelope>
    xmlns:S="http://schemas.xmlsoap.org/soap/envelope/"
    xmlns:aol="http://schemas.aol.com/"
    xmlns:disco="urn:liberty:disco:2003-08"
    xmlns:ds="http://www.w3.org/2000/09/xmldsig#"
    xmlns:sb="urn:liberty:wsf:soap-bind:1.0" >
    <S:Header>
        <sb:Correlation S:mustUnderstand="1"
            messageID="uuid:958312848-29348938-232342121"
            timestamp="2003-06-06T18:29:18Z" />
        <wsse:Security>
            <lib:Assertion MajorVersion="1" MinorVersion="2"
                AssertionID="9fd3eda-b34a-9008-a334-3234dea90f5"
                Issuer="http://idp.aol.com"
                IssueInstant="2003-06-06T18:29:18Z"
                InResponseTo="uuid:0023923-28329023-238239026">
                <saml:Conditions NotOnOrAfter="2003-06-07T12:10:10Z">
                    <saml:AudienceRestrictionCondition>
                        <saml:Audience>http://photo.ws.aol.com</saml:
                        Audience>
                    </saml:AudienceRestrictionCondition>
                </saml:Conditions>
                <lib:AuthenticationStatement
                    AuthenticationInstant="2003-06-06:12:10:11Z"
                    SessionIndex="1" >
                    <lib:AuthnContext>
                        <lib:AuthnContextClassRef>
                            http://schemas.aol.com/authctx/classes/
                            DeviceProtectedTransport
                        </lib:AuthnContextClassRef>
                    </lib:AuthnContext>
                    <lib:Subject>
                        <saml:NameIdentifier>
                            <lib:NameQualifier>http://aol.com</
                            NameQualifier>
                            <lib:Format>urn:liberty:iff:nameid:federated</
                            Format>
                            AOLScreenname
                        </saml:NameIdentifier>
                        <saml:SubjectConfirmation>
                            <saml:ConfirmationMethod>
                                urn:oasis:names:tc:SAML:1.0:cm:Bearer
                            </saml:ConfirmationMethod>
                        </saml:SubjectConfirmation>
                    </lib:Subject>
                </lib:AuthenticationStatement>
            <saml:AttributeStatement>
                <lib:Subject>
                    <saml:NameIdentifier>
                        <lib:NameQualifier>http://aol.com</NameQualifier>
                        <lib:Format>urn:liberty:iff:nameid:federated</Format>
                        AOLScreenname
                    </saml:NameIdentifier>
                    <saml:SubjectConfirmation>
                        <saml:ConfirmationMethod>
                            urn:oasis:names:tc:SAML:1.0:cm:Bearer
                        </saml:ConfirmationMethod>
                    </saml:SubjectConfirmation>
                </lib:Subject>
                <saml:Attribute AttributeName="devUPC"
                    AttributeNamespace="http://schemas.aol.com">
                    <saml:AttributeValue>123456789012</saml:
                    AttributeValue>
                </saml:Attribute>
            </saml:AttributeStatement>
            <ds:Signature>
                Signature data goes here
            </ds:Signature>
            </lib:Assertion>
        </wsse:Security>
    </S:Header>
    <S:Body>
        // Photo Service Request
    </S:Body>
</S:Envelope>.
```

Because this is the first request to the photo service, there is no "refToMessageID" included. Also, the assertion returned with the discovery service response is included in this message.

The photo service may then return the requested information. An example is illustrated by the following:

```
<?xml version="1.0" encoding="utf-8" ?>
<S:Envelope>
    xmlns:S="http://schemas.xmlsoap.org/soap/envelope/"
    xmlns:aol="http://schemas.aol.com/"
    xmlns:sb="urn:liberty:wsf:soap-bind:1.0">
    <S:Header>
        <sb:Correlation S:mustUnderstand="1"
            messaggeID="uuid:23452-7345097234-
                0974234097"
            refToMessageID="uuid:958312848-29348938-
                232342121"
            timestamp="2003-06-06T12:10:16Z"/>
        <aol:ServiceSessionContext
            NotOnOrAfter="2003-06-07T12:10:10Z">
            0239238                          as;d347;
            hadfg4adejhrtwe45phwerjhw4569werlhtwe
            4523p458her09234ih342309ua;
            oqe4pyw45tliwuw45yw45tgi5w
```

```
        45t4j092u3rrjrhwr83q4r34kjh4934q34hwe9823408
            ojasdf=
        23047lsadf
    </aol:ServiceSessionContext>
  <S:Header>
  <S:Body>
    // Station List data included here
  </S:Body>
<S:Envelope>.
```

As the radio service did, the photo service returns a <Service-SessionContext> to the user interface device. However, in this response, the photo service does not redirect the user to a different endpoint.

After using the discovery service security token for a period of time (e.g., twenty-four hours), the token may be close to expiring. For the acknowledgement illustrated above from the authentication service, assume that almost twenty-four hours has elapsed since the original authentication by the authentication service and that the user interface device is monitoring the validity period of the security token. Thus, the user interface device knows that it needs to update the token if it wishes to continue with this session. The user interface device may submit a request to the authentication service where the original authentication took place by using the following:

```
<?xml version="1.0" encoding="utf-8" ?>
<S:Envelope>
    xmlns:S="http://schemas.xmlsoap.org/soap/envelope/"
    xmlns:aol="http://schemas.aol.com/"
    xmlns:disco="urn:liberty:disco:2003-08"
    xmlns:ds="http://www.w3.org/2000/09/xmldsig#"
    xmlns:sb="urn:liberty:wsf:soap-bind:1.0"
    xmlns:sa="urn:liberty:wsf:soap-auth:1.0" >
  <S:Header>
    <sb:Correlation S:mustUnderstand="1"
      messageID="uuid:234235-993209787-099087238923"
      timestamp="2003-06-07T12:00:00Z" />
    <wsse:Security>
      <lib:Assertion MajorVersion="1" MinorVersion="2"
        AssertionID="e06e5a28-bc80-4ba6-9ecb-712949db686e"
        Issuer="http://idp.aol.com"
        IssueInstant="2003-06-06T12:10:11Z"
        InResponseTo="uuid:0023923-28329023-238239026">
        <saml:Conditions NotOnOrAfter="2003-06-07T12:10:10Z" >
          <saml:AudienceRestrictionCondition>
            <saml:Audience>http://discovery.aol.com</saml:
            Audience>
          </saml:AudienceRestrictionCondition>
        </saml:Conditions>
        <lib:AuthenticationStatement
          AuthenticationInstant="2003-06-06:12:10:11Z"
          SessionIndex="1" >
          <lib:AuthnContext>
            <lib:AuthnContextClassRef>
              http://schemas.aol.com/authctx/classes/
              DeviceProtectedTransport
            </lib:AuthnContextClassRef>
          </lib:AuthnContext>
          <lib:Subject>
            <saml:NameIdentifier>
              <lib:NameQualifier>http://aol.com</lib:NameQualifier>
              <lib:Format>urn:liberty:iff:nameid:federated</lib:Format>
              AOLScreenname
            </saml:NameIdentifier>
            <saml:SubjectConfirmation>
              <saml:ConfirmationMethod>
                urn:oasis:names:tc:SAML:1.0:cm:Bearer
              </saml:ConfirmationMethod>
            </saml:SubjectConfirmation>
          </lib:Subject>
        </lib:AuthenticationStatement>
        <saml:AttributeStatement>
```

```
          <lib:Subject>
            <saml:NameIdentifier>
              <lib:NameQualifier>http://aol.com</NameQualifier>
              <lib:Format>urn:liberty:iff:nameid:federated
              </Format>
              AOLScreenname
            </saml:NameIdentifier>
          </lib:Subject>
          <saml:Attribute AttributeName="devUPC"
            AttributeNamespace="http://schemas.aol.com">
            <saml:AttributeValue>123456789012</saml:
            AttributeValue>
          </saml:Attribute>
        </saml:AttributeStatement>
        <ds:Signature>
          Signature data goes here
        </ds:Signature>
      </lib:Assertion>
    </wsse:Security>
  </S:Header>
  <S:Body>
    <aol:AuthRequest renewal="true" />
  </S:Body>
</S:Envelope>.
```

By doing this, the previously returned security token is presented back to the authentication service. The "renewal" attribute is all that is needed on this authentication request.

The authentication service may then process the request. If the request is valid, the service returns the renewed security token to the user interface device. The return message is illustrated by the following:

```
<?xml version="1.0" encoding="utf-8" ?>
<S:Envelope>
    xmlns:S="http://schemas.xmlsoap.org/soap/envelope/"
    xmlns:aol="http://schemas.aol.com/"
    xmlns:disco="urn:liberty:disco:2003-08"
    xmlns:ds="http://www.w3.org/2000/09/xmldsig#"
    xmlns:sb="urn:liberty:wsf:soap-bind:1.0"
    xmlns:sa="urn:liberty:wsf:soap-auth:1.0" >
  <S:Header>
    <sb:Correlation S:mustUnderstand="1"
      messageID="uuid:87432-79234723-072347893"
      refToMessageID="uuid:234235-993209787-099087238923"
      timestamp="2003-06-07T12:00:00Z" />
  </S:Header>
  <S:Body>
    <aol:AuthResponse>
      <sa:SASLResponse>
        <sa:Status code="success" />
        <sa:Credential>
          <lib:Assertion MajorVersion="1" MinorVersion="2"
            AssertionID="9fe4357-df43-b902-9123-da8082fe7"
            Issuer="http://idp.aol.com"
            IssueInstant="2003-06-07T12:10:00Z"
            InResponseTo=" uuid:234235-993209787-
            099087238923">
            <saml:Conditions    NotOnOrAfter="2003-06-
            08T12:00:00Z" >
              <saml:AudienceRestrictionCondition>
                <saml:Audience>http://discovery.aol.com
                </saml:Audience>
              </saml:AudienceRestrictionCondition>
            </saml:Conditions>
            <lib:AuthenticationStatement
              AuthenticationInstant="2003-06-06T12:10:11Z"
              SessionIndex="1" >
              <lib:AuthnContext>
                <lib:AuthnContextClassRef>
                  http://schemas.aol.com/authctx/classes/
                  DeviceProtectedTransport
                </lib:AuthnContextClassRef>
              </lib:AuthnContext>
              <lib:Subject>
```

```
            <saml:NameIdentifier>
                <lib:NameQualifier>http://aol.com
                </NameQualifier>
                <lib:Format>urn:liberty:iff:nameid:federated
                </Format>
                AOLScreenname
            </saml:NameIdentifier>
        <saml:SubjectConfirmation>
            <saml:ConfirmationMethod>
                urn:oasis:names:tc:SAML:1.0:cm:Bearer
            </saml:ConfirmationMethod>
        </saml:SubjectConfirmation>
            </lib:Subject>
        </lib:AuthenticationStatement>
        <saml:AttributeStatement>
            <lib:Subject>
                <saml:NameIdentifier>
                    <lib:NameQualifier>http://aol.com
                    </NameQualifier>
                    <lib:Format>urn:liberty:iff:nameid:federated
                    </Format>
                    AOLScreenname
                </saml:NameIdentifier>
            </lib:Subject>
            <saml:Attribute AttributeName="devUPC"
                AttributeNamespace="http://schemas.aol.com">
                <saml:AttributeValue>123456789012
                </saml:AttributeValue>
            </saml:Attribute>
        </saml:AttributeStatement>
        <ds:Signature>
            Signature data goes here
        </ds:Signature>
      </lib:Assertion>
    </sa:Credential>
   </sa:SASLResponse>
  </aol:AuthResponse>
 </S:Body>
</S:Envelope>.
```

The discovery service bootstrap information, however, is not included, because it was sent previously. The renewed token still has the same "AuthenticationInstant" since this is a renewal and not a re-authentication.

The invention may be implemented in digital circuitry or in computer hardware, firmware, or software, or in combinations of them. The invention may be implemented as a computer program product (i.e., a computer program tangibly embodied in an information carrier (e.g., in a machine-readable storage device or in a propagated signal)) for execution by, or to control the operation of, a data processing apparatus (e.g., a programmable processor, a computer, or multiple computers). A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method operations of the invention may be performed by one or more programmable processors executing a computer program to perform functions of the invention by operating on input data and generating output. Method operations may also be performed by, and an apparatus of the invention may be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory, a random access memory, or both. The essential elements of a computer are a processor for executing instructions and one or more memory devices for storing instructions and data. Generally, a computer will also include, or be operatively coupled to receive data from, transfer data to, or both, one or more mass storage devices for storing data (e.g., magnetic, magneto-optical, or optical disks). Information carriers suitable for embodying computer program instructions and data include all forms of non-volatile memory, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory may be supplemented by, or incorporated in special purpose logic circuitry.

To provide for interaction with a user, the invention may be implemented on a computer having a display device (e.g., a CRT (cathode ray tube) or FPD (flat panel display) (e.g., LCD (liquid crystal display)) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual, auditory, or tactile); and input from the user may be received in any form, including visual, auditory, or tactile input.

The invention may be implemented in a computing system that includes a back-end component (e.g., a data server), a middleware component (e.g., an application server), a front-end component (e.g., a client computer having a graphical user interface or a Web browser through which a user may interact with an implementation of the invention), or any combination of such back-end, middleware, and front-end components. The components of the system may be interconnected by any form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

Several implementations have been described, and other implementations have been mentioned or suggested. Moreover, various additions, deletions, substitutions, and modifications will be readily suggested to those skilled in the art. For these reasons, the invention is to be measured by the following claims, which may include one or more of these implementations.

The invention claimed is:

1. A method for invoking a service provider, the method comprising:
   receiving a first service request at a server of a service provider configured to provide data delivery service, the first service request including a security token;
   determining, with the server, whether the security token is valid for all service requests;
   if the security token is valid, determining a session security token and generating a first service response including the session security token;

receiving a second service request at the server of the service provider, the second service request including the session security token;

determining, with the server, whether the session security token is valid;

if the session security token is valid, generating a second service response;

determining, after the first service response including the session security token has been generated, whether the security token has become invalid; and if the security token has become invalid, revoking the session security token.

2. The method of claim 1, wherein determining the session security token comprises:

determining whether the session security token should be generated; and if the session security token should be generated, generating the session security token.

3. The method of claim 1, wherein the second service response comprises a message with a header, the header specifying that future service requests should be sent to a different server.

4. The method of claim 1, further comprising:

determining whether the session security token has become invalid; and if the session security token has become invalid, revoking the session security token.

5. The method of claim 1, further comprising:

determining whether a request to update the session security token has been received; and if the request to update the session security token has been received, validating the request and modifying the validity period of the session security token if the request is valid.

6. The method of claim 5, wherein updating the session security token does not occur if the session security token has expired.

7. The method of claim 1, further comprising:

receiving a third service request at the service provider, the third service request including the session security token;

determining whether the session security token is valid; and if the session security token is valid, determining a second session security token and generating a third service response including the second session security token;

wherein the second session security token is used in providing the third data service concurrently with the session security token being used to provide the second data service.

8. The method of claim 1, wherein the requests and responses are expressed in a self-describing protocol.

9. The method of claim 8, wherein the protocol comprises the Simple Object Access Protocol.

10. The method of claim 8, wherein:

the security token is received in a first request header type; and the session security token is received in a second request header type.

11. The method of claim 1, wherein:

the first service request comprises a data service request;

the service provider comprises a data service provider; and the session security token comprises a data session security token.

12. The method of claim 1, wherein the security token is generated by a service infrastructure for the service provider.

13. The method of claim 12, wherein the service infrastructure is configured to:

determine the availability of one or more service providers; and determine security tokens for the available service providers.

14. The method of claim 12, wherein the service provider and the service infrastructure utilize a common server.

15. The method of claim 1, wherein:

the security token comprises an externally-generated security token, and the session security token comprises a self-determined security token; and the method further comprises:

substituting the externally-generated security token with the self-determined security token such that a third service request utilizes the self-determined token;

receiving the third service request at the server of the service provider;

determining if the third service request is valid; and upon determining that the third service request is valid, generating a third service response.

16. The method of claim 15, further comprising updating the self-determined security token at the service provider.

17. A method for invoking a service provider, the method comprising:

receiving a service discovery request at a first server of a service infrastructure for a plurality of service providers;

determining, with the first server of the service infrastructure, the availability of one or more service providers;

determining, with the first server of the service infrastructure, security tokens for the available service providers;

generating, with the first server, a response at the service infrastructure, the response including the available service providers and their security tokens;

receiving a first service request at a second server of a service provider associated with the service infrastructure, the service provider configured to provide a data delivery service, and the first service request including the security token associated with the service provider;

determining, with the second server of the service provider, whether the security token is valid for all service requests;

if the security token is valid, determining a session security token at the service provider and generating a first service response including the session security token;

receiving a second service request at the second server of the service provider, the second service request including the session security token;

determining, with the second server of the service provider, whether the session security token is valid;

if the session security token is valid, generating a second service response at the service provider;

determining whether the security token has become invalid after the first service response including the session security token has been generated; and if the security token has become invalid, revoking the session security token.

18. The method of claim 17, further comprising:

determining whether a request to update the session security token has been received; and if a request to update the session security token has been received, validating the request and modifying the validity period of the session security token if the request is valid.

19. The method of claim 17, further comprising:
receiving a third service request at the service provider, the third service request including the session security token;
determining whether the session security token is valid; and
if the session security token is valid, determining a second session security token and generating a third service response including the second session security token;

wherein the second session security token is used in providing the third data delivery service concurrently with the session security token being used to provide the second data delivery service.

* * * * *